United States Patent
Stephen et al.

(10) Patent No.: US 12,071,507 B2
(45) Date of Patent: Aug. 27, 2024

(54) METHOD AND COMPOSITION FOR IMPROVING ADHESION OF METATHESIS COMPOSITIONS TO SUBSTRATES

(71) Applicant: MATERIA, INC., Pasadena, CA (US)

(72) Inventors: Anthony R. Stephen, South Pasadena, CA (US); Christopher J. Cruce, Poway, CA (US); Mark S. Trimmer, Monrovia, CA (US); Michael A. Giardello, Pasadena, CA (US)

(73) Assignee: MATERIA, INC.

(*) Notice: Subject to any disclaimer, the term of this patent is extended or adjusted under 35 U.S.C. 154(b) by 0 days.

(21) Appl. No.: 15/955,876

(22) Filed: Apr. 18, 2018

(65) Prior Publication Data

US 2018/0237581 A1 Aug. 23, 2018

Related U.S. Application Data

(63) Continuation of application No. 15/109,703, filed as application No. PCT/US2015/011048 on Jan. 12, 2015.

(60) Provisional application No. 61/925,803, filed on Jan. 10, 2014.

(51) Int. Cl.

| | |
|---|---|
| *C08G 61/02* | (2006.01) |
| *B29B 15/12* | (2006.01) |
| *C03C 17/32* | (2006.01) |
| *C03C 25/30* | (2018.01) |
| *C08G 61/08* | (2006.01) |
| *C08J 5/04* | (2006.01) |
| *C08K 3/36* | (2006.01) |
| *C08K 3/40* | (2006.01) |
| *C08K 5/14* | (2006.01) |
| *C08K 5/5419* | (2006.01) |
| *C08K 5/5425* | (2006.01) |
| *C08K 7/14* | (2006.01) |
| *C08K 7/28* | (2006.01) |
| *C08L 65/00* | (2006.01) |
| *C09D 165/00* | (2006.01) |
| *B29K 309/08* | (2006.01) |

(52) U.S. Cl.
CPC ............ *C08G 61/02* (2013.01); *B29B 15/122* (2013.01); *C03C 17/328* (2013.01); *C03C 25/30* (2013.01); *C08G 61/08* (2013.01); *C08J 5/043* (2013.01); *C08K 3/36* (2013.01); *C08K 3/40* (2013.01); *C08K 5/14* (2013.01); *C08K 5/5419* (2013.01); *C08K 5/5425* (2013.01); *C08K 7/14* (2013.01); *C08K 7/28* (2013.01); *C08L 65/00* (2013.01); *C09D 165/00* (2013.01); *B29K 2309/08* (2013.01); *C08G 2261/3325* (2013.01); *C08G 2261/964* (2013.01); *C08J 2323/20* (2013.01)

(58) Field of Classification Search
CPC .................. C08G 61/02; C08G 61/08; C08G 2261/3325; C08G 2261/964; B29B 15/122; C03C 17/328; C03C 25/30; C08J 5/043; C08J 2323/20; C08K 3/36; C08K 3/40; C08K 5/14; C08K 5/5419; C08K 5/5425; C08K 7/14; C08K 7/28; C08L 65/00; C09D 165/00; B29K 2309/08
See application file for complete search history.

(56) References Cited

U.S. PATENT DOCUMENTS

| | | | |
|---|---|---|---|
| 3,526,533 A | 9/1970 | Burton et al. | |
| 4,708,969 A | 11/1987 | Leach | |
| 4,891,387 A * | 1/1990 | Janda | C08G 61/08 |
| | | | 521/134 |
| 4,902,560 A | 2/1990 | Silver | |

(Continued)

FOREIGN PATENT DOCUMENTS

| | | | | |
|---|---|---|---|---|
| EP | 1652885 A1 | 5/2006 | | |
| EP | 2098550 A1 * | 9/2009 | ............... | C08K 3/36 |

(Continued)

OTHER PUBLICATIONS

Slugovc et al (Polymer 51, 2010, 2927-2946). (Year: 2010).*
International Preliminary Report on Patentability in corresponding International Application No. PCT/US2015/011048, dated Jul. 21, 2016.
Hercules Research Disclosure, Nov. 1992, No. 343.
Chatterjee et al., "A General Model for Selectivity in Olefin Cross Metathesis," J. Am. Chem. Soc., 2003, 125, pp. 11360-11370.

(Continued)

*Primary Examiner* — Robert S Jones, Jr.
*Assistant Examiner* — Jiangtian Xu
(74) *Attorney, Agent, or Firm* — RAPHAEL BELLUM PLLC

(57) ABSTRACT

A method of improving the adhesion of metathesis compositions, such as ring-opening metathesis polymerization (ROMP) compositions, to a substrate is disclosed, in which an adhesion promoter is added to a polymerizable resin composition in order to improve the adhesion of the polymerizing resin to a substrate material. The addition of the adhesion promoter has been found to provide beneficial improvements in the adhesion of metathesis, especially ROMP, compositions to substrates, particularly glass surfaces, leading to improved characteristics in ROMP materials formed therefrom. The adhesion promoter generally comprises a functionalized silane compound and a peroxide compound. A ROMP composition is further disclosed comprising a cyclic olefin, a ROMP metathesis catalyst, and the adhesion promoter. Polymer products produced via metathesis (ROMP) reactions of the invention may be utilized to provide a wide range of materials and in a variety of composite applications. The invention has utility in the fields of catalysis, organic synthesis, and polymer and materials chemistry and manufacture.

11 Claims, No Drawings

(56) References Cited

U.S. PATENT DOCUMENTS

| | | | |
|---|---|---|---|
| 4,959,395 A * | 9/1990 | Janda | C08G 61/08 |
| | | | 521/134 |
| 4,990,549 A | 2/1991 | Delvin et al. | |
| 5,055,499 A | 10/1991 | Endo et al. | |
| 5,063,103 A | 11/1991 | Sugawara et al. | |
| 5,096,644 A | 3/1992 | Endo et al. | |
| 5,219,656 A | 6/1993 | Klett et al. | |
| 5,342,909 A | 8/1994 | Grubbs et al. | |
| 5,428,098 A | 6/1995 | Brekner et al. | |
| 5,728,785 A | 3/1998 | Grubbs et al. | |
| 5,840,238 A | 11/1998 | Setiabudi et al. | |
| 5,939,504 A | 8/1999 | Woodson, Jr. et al. | |
| 5,973,085 A | 10/1999 | Muhlebach et al. | |
| 6,001,909 A | 12/1999 | Setiabudi | |
| 6,040,363 A | 3/2000 | Warner et al. | |
| 6,107,420 A | 8/2000 | Grubbs et al. | |
| 6,310,121 B1 | 10/2001 | Woodson, Jr. et al. | |
| 6,409,875 B1 | 6/2002 | Giardello et al. | |
| 6,518,330 B2 | 2/2003 | White et al. | |
| 6,525,125 B1 | 2/2003 | Giardello et al. | |
| 6,552,139 B1 | 4/2003 | Herrmann et al. | |
| 6,620,955 B1 | 9/2003 | Pederson et al. | |
| 6,635,768 B1 | 10/2003 | Herrmann et al. | |
| 6,787,620 B2 | 9/2004 | Herrmann et al. | |
| 6,838,489 B2 | 1/2005 | Bell et al. | |
| 6,908,970 B2 | 6/2005 | Tsunogae et al. | |
| 6,921,735 B2 | 7/2005 | Hoveyda et al. | |
| 6,995,226 B2 | 2/2006 | Taguchi et al. | |
| 7,001,590 B1 | 2/2006 | Angeletakis | |
| 7,026,495 B1 | 4/2006 | Pederson et al. | |
| 7,294,717 B2 | 11/2007 | Herrmann et al. | |
| 7,339,006 B2 | 3/2008 | Giardello et al. | |
| 7,378,528 B2 | 5/2008 | Herrmann et al. | |
| 7,381,782 B2 | 6/2008 | Sugawara et al. | |
| 7,476,716 B2 | 1/2009 | Sugawara | |
| 7,652,145 B2 | 1/2010 | Herrmann et al. | |
| 7,771,834 B2 | 8/2010 | Sugawara | |
| 7,902,279 B2 * | 3/2011 | Lin | C08G 61/08 |
| | | | 524/114 |
| 7,964,320 B2 | 6/2011 | Giardello et al. | |
| 8,597,794 B2 | 12/2013 | Giardello et al. | |
| 10,059,857 B2 * | 8/2018 | Stephen | C09D 143/00 |
| 2003/0055262 A1 | 3/2003 | Grubbs et al. | |
| 2003/0186035 A1 * | 10/2003 | Cruce | C04B 41/009 |
| | | | 428/292.4 |
| 2006/0052487 A1 * | 3/2006 | Cruce | C04B 41/009 |
| | | | 524/2 |
| 2006/0143510 A1 | 6/2006 | Ikeda et al. | |
| 2006/0211809 A1 | 9/2006 | Kodemura et al. | |
| 2007/0037946 A1 | 2/2007 | Sugawara | |
| 2007/0187034 A1 | 8/2007 | Dux et al. | |
| 2009/0036614 A1 | 2/2009 | Sugawara | |
| 2009/0143510 A1 * | 6/2009 | Lin | C08G 61/08 |
| | | | 524/114 |
| 2010/0015871 A1 | 1/2010 | Tanimoto et al. | |
| 2010/0144924 A1 * | 6/2010 | Yoshiwara | C08G 61/08 |
| | | | 523/218 |
| 2011/0237718 A1 | 9/2011 | Yoshiwara | |
| 2012/0058275 A1 | 3/2012 | Giardello et al. | |
| 2012/0088879 A1 | 4/2012 | Yoshiwara | |
| 2012/0255610 A1 | 10/2012 | Bokria et al. | |
| 2014/0329017 A1 | 11/2014 | Wang et al. | |
| 2015/0152283 A1 * | 6/2015 | Stephen | C09D 143/00 |
| | | | 427/331 |
| 2015/0166767 A1 | 6/2015 | Cruce et al. | |
| 2016/0185885 A1 * | 6/2016 | Stephen | C08F 32/00 |
| | | | 502/167 |
| 2016/0326304 A1 * | 11/2016 | Stephen | C03C 25/30 |
| 2017/0130089 A1 * | 5/2017 | Stephen | C09D 143/00 |
| 2018/0237581 A1 * | 8/2018 | Stephen | C03C 25/30 |

FOREIGN PATENT DOCUMENTS

| | | | |
|---|---|---|---|
| EP | 2562821 A1 | | 2/2013 |
| JP | H0563371 | * | 3/1993 |
| JP | 2003155331 A | | 5/2003 |
| RU | 2527278 C1 | | 8/2014 |
| WO | 96/16008 A1 | | 5/1996 |
| WO | 97/14738 A1 | | 4/1997 |
| WO | 99/11454 A1 | | 3/1999 |
| WO | 02/14376 A2 | | 2/2002 |
| WO | 03/011455 A1 | | 2/2003 |
| WO | 2012/174502 A2 | | 12/2012 |

OTHER PUBLICATIONS

Sanford et al., "New Insights into the Mechanism of Ruthenium-Catalyzed Olefin Metathesis Reactions," J. Am. Chem. Soc., 2001, 123, pp. 749-750.

Scholl et al., "Synthesis and Activity of a New Generation of Ruthenium-Based Olefin Metathesis Catalysts Coordinated with 1,3-Dimesityl-4,5-dihydroimidazol-2-ylidene Ligands," Org. Lett., 1999, Vo. 1, No. 6, pp. 953-956.

Schwab et al., "Synthesis and Applications of RuC12(= CHR')(PR3)2: The Influence of the Alkylidene Moiety on Metathesis Activity," J. Am. Chem. Soc., 1996, 118, pp. 100-110.

"Compression Molding", Composites Lab, 2016, Accessed 2019, ACMA.

"Sheet Molding Compounds and Bulk Molding Overview", IDI Composites, 2019, Accessed 2019, IDI Composites International, Noblesville, Indiana.

Sheet Molding Compound | Compression Molding Process, Romeo RIM Accessed 2019, Romeo RIM.

Ornaghi et al., "Mechanical and Dynamic Mechanical Analysis of Hybrid Composites Molded by Resin Transfer Molding", Journal of Applied Polymer Science, 2010, 887-896, 118, Wiley Periodicals, Inc.

Staff, "Resin Infusion Process", Composites World, Accessed 2019, Composites World.

Heider et al., "Feedback control of the vacuum assisted resin transfer molding (VARTM) process", SPIE Conference on Process Contol and Sensors for Manufacturing, Mar. 1999, 3589, SPIE.

"Resin Transfer Molding", Composites Lab, 2016, Accessed 2019, ACMA.

Hayward et al., "The effect of vacuum assistance in resin transfer moulding", Composite Manufacturing, Sep. 1990, 1(3), Butterworth-Heinemann Ltd.

Issa et al., "Kintetics of Alkoxysilanes and Organoalkoxysilanes Polymerization: A Review," Polymers, 2019, 11, 3, 537.

* cited by examiner

METHOD AND COMPOSITION FOR IMPROVING ADHESION OF METATHESIS COMPOSITIONS TO SUBSTRATES

RELATED APPLICATIONS

This application claims priority to U.S. patent application Ser. No. 15/109,703, filed Jul. 5, 2016; which claims priority to PCT International Application PCT/US2015/011048, filed Jan. 12, 2015; which claims the benefit of priority to U.S. Provisional Patent Application No. 61/925,803, filed Jan. 10, 2014, the contents of which are incorporated herein by reference.

TECHNICAL FIELD

The present invention relates to methods and compositions for improving the adhesion of olefin metathesis compositions to substrate materials. More particularly, the invention relates to methods and compositions for improving the adhesion of ring opening metathesis polymerization (ROMP) compositions to substrates, especially glass surface materials. Polymer products produced via the metathesis reactions of the invention may be utilized for a wide range of materials and composite applications. The invention has utility in the fields of catalysis, organic synthesis, and polymer and materials chemistry and manufacture.

BACKGROUND

Polymer-matrix composites offer unique combinations of properties and are useful in a wide range of applications. Such composites may be fabricated utilizing either thermosetting or thermoplastic polymer matrix materials with a variety of particulate or fibrous fillers or reinforcements. It is generally advantageous to have strong adhesion between the polymer matrix material and the surfaces of the various particulate or fibrous substrates and there is considerable art related to substrate finishes and other treatments to optimize adhesion to polymer matrices. For example, in the production long-fiber reinforced composites, improved adhesion between the polymer matrix and the fiber reinforcement leads to increased material performance. Good adhesion is particularly important where failures are likely to occur by delamination or by other adhesive failure modes.

As described in, for example, U.S. Pat. Nos. 5,840,238, 6,310,121 and 6,525,125, polymers generated by olefin metathesis processes are attractive as composite matrix materials. Of particularly beneficial use are the polymers generated by the ring opening metathesis polymerization (ROMP) of cyclic olefins. The low viscosity of cyclic olefin resin formulations and the ability to control ROMP kinetics (e.g., U.S. Pat. Nos. 4,708,969 and 5,939,504) facilitate composite processing and manufacture, and the corrosion resistance and high toughness of ROMP polymers leads to good composite durability. Additionally, certain properties of ROMP polymers, e.g., mechanical strength and stiffness, heat distortion temperature and solvent resistance, can be further enhanced by crosslinking induced via thermal treatment (e.g., U.S. Pat. No. 4,902,560) or chemically by addition of peroxides (e.g., U.S. Pat. No. 5,728,785).

Commercially important ROMP resin formulations are generally based on readily available and inexpensive cyclic olefins such as dicyclopentadiene (DCPD), norbornenes, cyclooctadiene (COD) and various cycloalkenes. However, in contrast to traditional resin systems (e.g., epoxy, acrylate, urethane, and polyester resins) based on polar functional group chemistries, these nonpolar ROMP resins have poor intrinsic adhesion to the relatively polar surfaces of common carbon, glass, or mineral fillers and reinforcements. The addition of various silanes to such resin formulations for improvement of electrical and mechanical properties of ROMP polymers is described in U.S. Pat. Nos. 5,840,238, 6,001,909, and 7,339,006. Many widely used commercial silanes do not give optimal properties with ROMP polymers, however, and the greatest enhancements are only obtained when the silanes comprise groups with high metathesis activity (the relative reactivity of various metathesis active groups is described in J. Am. Chem. Soc., 2003, 125, 11360-11370).

Despite the advances achieved in the art, particularly in the properties of ROMP polymers and their associated applications, a continuing need therefore exists for further improvement in a number of areas, including the adhesion of ROMP compositions to substrate materials.

SUMMARY OF THE DISCLOSURE

The invention is directed to addressing one or more of the aforementioned concerns and relates to the use of an adhesion promoter in a metathesis composition, such as a ROMP composition, to provide useful improvements in the adhesion of a metathesis catalyzed composition to a substrate material. More particularly, the inventors have discovered that addition of an adhesion promoter according to the invention to the reaction mixture of a metathesis composition, particularly a ROMP composition, allows for improvements in the adhesion of the polymerized (resin) composition to the substrate material, without adversely affecting the mechanical properties of the polymerized resin. In some aspects of the invention, the resin formulation provides for an unexpected synergistic improvement in mechanical properties of filled or reinforced metathesis polymer systems in which the improvement obtained through the use of the adhesion promoter is greater than any improvement that might be obtained through the use of individual components of the adhesion promoter.

In one embodiment, the invention provides a method for improving the adhesion of a ROMP reaction of a cyclic olefin catalyzed by a cyclic olefin metathesis catalyst to a substrate material, in which an adhesion promoter is combined with a cyclic olefin, a cyclic olefin metathesis catalyst, and, optionally, a substrate material, thereby forming a ROMP composition. The adhesion promoter according to the invention generally includes a functionalized silane and a peroxide compound. The ROMP composition is then subjected to conditions effective to promote a ROMP reaction of the cyclic olefin in the presence of the cyclic olefin metathesis catalyst, the adhesion promoter, and the optional substrate material. The ROMP composition may also be contacted with a substrate material, rather than, or in addition to the substrate material added to the ROMP composition, and then subjected to conditions effective to promote a ROMP reaction of the cyclic olefin in the presence of the cyclic olefin metathesis catalyst, the adhesion promoter, and the optional added substrate material and/or in contact with the substrate material.

The invention is further directed to a ROMP composition of a cyclic olefin, which may be functionalized or unfunctionalized and may be substituted or unsubstituted, a cyclic olefin metathesis catalyst, a functionalized silane, and a peroxide. In general, the adhesion promoter comprises the functionalized silane and the peroxide, which together are added in an amount effective to increase the adhesion of the ROMP composition to a substrate material when the ROMP composition is subjected to metathesis catalysis conditions in the presence of the substrate material. The addition of the adhesion promoter provides beneficial improvements in the adhesion of a metathesis (e.g., ROMP) composition to the substrate material as compared to a metathesis composition that is the same with the exception that the adhesion promoter is not included.

In a further embodiment of the invention provides an adhesion promoter comprising at least one functionalized silane and at least one peroxide.

In a further embodiment of the invention provides an adhesion promoter comprising at least one functionalized silane and at least one dialkyl peroxide.

In a further embodiment of the invention provides an adhesion promoter composition comprising at least one functionalized silane and at least one peroxide.

In a further embodiment of the invention provides an adhesion promoter composition comprising at least one functionalized silane and at least one dialkyl peroxide.

In a further embodiment of the invention, the adhesion promoter comprises a functionalized silane of the formula $Fn^*\text{-}(A^*)_{n^*}\text{-}Si(OR^*)_3$, wherein $Fn^*$ is a functional group selected from acrylate, methacrylate, allyl, vinyl, alkene, cycloalkene, or norbornene; $A^*$ is a divalent linking group selected from hydrocarbylene, substituted hydrocarbylene, heteroatom-containing hydrocarbylene, or substituted heteroatom-containing hydrocarbylene; $n^*$ is 0 or 1; and $R^*$ is selected from hydrocarbyl, substituted hydrocarbyl, heteroatom-containing hydrocarbyl, or substituted heteroatom-containing hydrocarbyl; and a peroxide selected from dialkyl and diaryl peroxides.

An adhesion promoter composition, comprising:
at least one functionalized silane of the formula

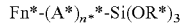

wherein,
Fn* is a functional group selected from acryloyl, methacryloyl, allyl, vinyl, alkenyl, cycloalkenyl, or norbornenyl;
A* is a divalent linking group selected from hydrocarbylene, substituted hydrocarbylene, heteroatom-containing hydrocarbylene, or substituted heteroatom-containing hydrocarbylene;
n* is 0 or 1; and
R* is selected from hydrocarbyl, substituted hydrocarbyl, heteroatom-containing hydrocarbyl, or substituted heteroatom-containing hydrocarbyl; and
at least one peroxide.

In a further embodiment of the invention, the adhesion promoter comprises at least one functionalized silane of the formula $Fn^*\text{-}(A^*)_{n^*}\text{-}Si(OR^*)_3$, wherein $Fn^*$ is a functional group selected from acrylate (acryloyl or acryl), methacrylate (methacryloyl or methacryl), allyl, vinyl, alkene (alkenyl), cycloalkene (cycloalkenyl), or norbornene (norbornenyl); $A^*$ is a divalent linking group selected from hydrocarbylene, substituted hydrocarbylene, heteroatom-containing hydrocarbylene, or substituted heteroatom-containing hydrocarbylene; $n^*$ is 0 or 1; and $R^*$ is selected from hydrocarbyl, substituted hydrocarbyl, heteroatom-containing hydrocarbyl, or substituted heteroatom-containing hydrocarbyl; and at least one peroxide selected from dialkyl peroxides, wherein the alkyl groups may be substituted or unsubstituted, where the subsitutents may be selected from functional groups, $C_1$-$C_4$ alkyl groups, or aryl groups, further substituted with $C_1$-$C_6$ alkyl, halide, $C_1$-$C_6$ alkoxy or the substituents may be a phenyl group optionally substituted with halide, $C_1$-$C_6$ alkyl, or $C_1$-$C_6$ alkoxy.

In a further embodiment of the invention, the adhesion promoter comprises at least one functionalized silane of the formula $Fn^*\text{-}(A^*)_{n^*}\text{-}Si(OR^*)_3$, wherein $Fn^*$ is a functional group selected from acrylate (acryloyl or acryl), methacrylate (methacryloyl or methacryl), allyl, vinyl, alkene (alkenyl), cycloalkene (cycloalkenyl), or norbornene (norbornenyl); $A^*$ is a divalent linking group selected from hydrocarbylene, substituted hydrocarbylene, heteroatom-containing hydrocarbylene, or substituted heteroatom-containing hydrocarbylene; $n^*$ is 0 or 1; and $R^*$ is selected from hydrocarbyl, substituted hydrocarbyl, heteroatom-containing hydrocarbyl, or substituted heteroatom-containing hydrocarbyl; and at least one peroxide selected from di-tert-butyl peroxide or dicumyl peroxide.

In another embodiment the invention provides a composition, comprising: at least one cyclic olefin metathesis catalyst, at least one cyclic olefin, at least one functionalized silane, and at least one peroxide.

In another embodiment the invention provides a composition, comprising: at least one cyclic olefin metathesis catalyst, at least one cyclic olefin, at least one functionalized silane, and at least one dialkyl peroxide.

In another embodiment the invention provides a composition, comprising: at least one cyclic olefin metathesis catalyst, at least one cyclic olefin, at least one functionalized silane, at least one peroxide, and at least one substrate material.

In another embodiment the invention provides a composition, comprising: at least one cyclic olefin metathesis catalyst, at least one cyclic olefin, at least one functionalized silane, at least one dialkyl peroxide, and at least one substrate material.

In another embodiment the invention provides a ROMP composition, comprising: at least one cyclic olefin metathesis catalyst, at least one cyclic olefin, at least one functionalized silane, and at least one peroxide.

In another embodiment the invention provides a ROMP composition, comprising: at least one cyclic olefin metathesis catalyst, at least one cyclic olefin, at least one functionalized silane, and at least one dialkyl peroxide.

In another embodiment the invention provides a ROMP composition, comprising: at least one cyclic olefin metathesis catalyst, at least one cyclic olefin, at least one functionalized silane, at least one peroxide, and at least one substrate material.

In another embodiment the invention provides a ROMP composition, comprising: at least one cyclic olefin metathesis catalyst, at least one cyclic olefin, at least one functionalized silane, at least one dialkyl peroxide, and at least one substrate material.

In another embodiment the invention provides a method for improving the adhesion of a ROMP composition to at least one substrate material, comprising: combining at least one functionalized silane and at least one peroxide with at least one cyclic olefin and at least one cyclic olefin metathesis catalyst to form the ROMP composition, wherein the at least one cyclic olefin may be functionalized or unfunctionalized, and may be substituted or unsubstituted; contacting the ROMP composition with the at least one substrate material, or adding the at least one substrate material to the ROMP composition; and subjecting the ROMP composition to conditions effective to promote a ROMP reaction of the at least one cyclic olefin in the presence of the at least one cyclic olefin metathesis catalyst, the at least one functionalized silane, the at least one peroxide, and the at least one substrate material.

In another embodiment the invention provides a method for improving the adhesion of a ROMP composition to at least one substrate material, comprising: combining at least one functionalized silane and at least one dialkyl peroxide with at least one cyclic olefin and at least one cyclic olefin metathesis catalyst to form the ROMP composition, wherein the at least one cyclic olefin may be functionalized or unfunctionalized, and may be substituted or unsubstituted; contacting the ROMP composition with the at least one substrate material, or adding the at least one substrate material to the ROMP composition; and subjecting the ROMP composition to conditions effective to promote a ROMP reaction of the at least one cyclic olefin in the presence of the at least one cyclic olefin metathesis catalyst, the at least one functionalized silane, the at least one dialkyl peroxide, and the at least one substrate material.

In another embodiment the invention provides a method for improving the adhesion of a ROMP composition to at least one substrate material, comprising: combining at least one functionalized silane and at least one dialkyl peroxide with at least one cyclic olefin and at least one cyclic olefin metathesis catalyst to form the ROMP composition, wherein the at least one cyclic olefin may be functionalized or unfunctionalized, and may be substituted or unsubstituted; adding the at least one substrate material to the ROMP composition; and subjecting the ROMP composition to conditions effective to promote a ROMP reaction of the at least one cyclic olefin in the presence of the at least one cyclic olefin metathesis catalyst, the at least one functionalized silane, the at least one peroxide, and the at least one substrate material.

In another embodiment the invention provides a method for improving the adhesion of a ROMP composition to at least one substrate material, comprising: combining at least one functionalized silane and at least one dialkyl peroxide with at least one cyclic olefin and at least one cyclic olefin metathesis catalyst to form the ROMP composition, wherein the at least one cyclic olefin may be functionalized or unfunctionalized, and may be substituted or unsubstituted; adding the at least one substrate material to the ROMP composition; and subjecting the ROMP composition to conditions effective to promote a ROMP reaction of the at least one cyclic olefin in the presence of the at least one cyclic olefin metathesis catalyst, the at least one functionalized silane, the at least one dialkyl peroxide, and the at least one substrate material.

In another embodiment the invention provides a method for improving the adhesion of a ROMP composition to at least one substrate material, comprising: combining at least one functionalized silane and at least one peroxide with at least one cyclic olefin and at least one cyclic olefin metathesis catalyst to form the ROMP composition; contacting the ROMP composition with the at least one substrate material; and subjecting the ROMP composition to conditions effective to promote a ROMP reaction of the at least one cyclic olefin in the presence of the at least one cyclic olefin metathesis catalyst, the at least one functionalized silane, the at least one peroxide, and the at least one substrate material.

In another embodiment the invention provides a method for improving the adhesion of a ROMP composition to at least one substrate material, comprising: combining at least one functionalized silane and at least one dialkyl peroxide with at least one cyclic olefin and at least one cyclic olefin metathesis catalyst to form the ROMP composition; contacting the ROMP composition with the at least one substrate material; and subjecting the ROMP composition to conditions effective to promote a ROMP reaction of the at least one cyclic olefin in the presence of the at least one cyclic olefin metathesis catalyst, the at least one functionalized silane, the at least one dialkyl peroxide, and the at least one substrate material.

In another embodiment the invention provides a method for improving the adhesion of a ROMP composition to at least one substrate material, comprising: combining at least one functionalized silane, at least one peroxide, at least one cyclic olefin, and at least one cyclic olefin metathesis catalyst with at least one substrate material to form the ROMP composition; and subjecting the ROMP composition to conditions effective to promote a ROMP reaction of the at least one cyclic olefin in the presence of the at least one cyclic olefin metathesis catalyst, the at least one functionalized silane, the at least one peroxide, and the at least one substrate material.

In another embodiment the invention provides a method for improving the adhesion of a ROMP composition to at least one substrate material, comprising: combining at least one functionalized silane, at least one dialkyl peroxide, at least one cyclic olefin, and at least one cyclic olefin metathesis catalyst with at least one substrate material to form the ROMP composition; and subjecting the ROMP composition to conditions effective to promote a ROMP reaction of the at least one cyclic olefin in the presence of the at least one cyclic olefin metathesis catalyst, the at least one functionalized silane, the at least one dialkyl peroxide, and the at least one substrate material.

In another embodiment the invention provides an article of manufacture, comprising: at least one cyclic olefin metathesis catalyst, at least one cyclic olefin, at least one functionalized silane, at least one peroxide, and at least one substrate material.

In another embodiment the invention provides an article of manufacture, comprising: at least one cyclic olefin metathesis catalyst, at least one cyclic olefin, at least one functionalized silane, at least one dialkyl peroxide, and at least one substrate material.

In another embodiment the invention provides for articles of manufacture made by any of the methods described herein.

Use of at least one adhesion promoter for improving the adhesion of a composition to at least one substrate material, wherein the at least one adhesion promoter comprises at least one functionalized silane and at least one peroxide.

Use of at least one adhesion promoter for improving the adhesion of a composition to at least one substrate material, wherein the at least one adhesion promoter comprises at least one functionalized silane and at least one dialkyl peroxide.

Use of at least one adhesion promoter for improving the adhesion of a composition to at least one substrate material, wherein the at least one adhesion promoter comprises at least one functionalized silane and at least one peroxide, and the composition comprises at least one cyclic olefin and at least one cyclic olefin metathesis catalyst.

Use of at least one adhesion promoter for improving the adhesion of a composition to at least one substrate material, wherein the at least one adhesion promoter comprises at least one functionalized silane and at least one peroxide, and the composition comprises at least one cyclic olefin, at least one cyclic olefin metathesis catalyst, and the at least one adhesion promoter.

Use of at least one adhesion promoter for improving the adhesion of a composition to at least one substrate material, wherein the at least one adhesion promoter comprises at least one functionalized silane and at least one dialkyl peroxide, and the composition comprises at least one cyclic olefin and at least one cyclic olefin metathesis catalyst.

Use of at least one adhesion promoter for improving the adhesion of a composition to at least one substrate material, wherein the at least one adhesion promoter comprises at least one functionalized silane and at least one dialkyl peroxide, and the composition comprises at least one cyclic olefin, at least one cyclic olefin metathesis catalyst, and the at least one adhesion promoter.

Use of at least one adhesion promoter for improving the adhesion of a ROMP composition to at least one substrate material, wherein the at least one adhesion promoter comprises at least one functionalized silane and at least one peroxide, and the ROMP composition comprises at least one cyclic olefin and at least one cyclic olefin metathesis catalyst.

Use of at least one adhesion promoter for improving the adhesion of a ROMP composition to at least one substrate material, wherein the at least one adhesion promoter comprises at least one functionalized silane and at least one peroxide, and the ROMP composition comprises at least one cyclic olefin, at least one cyclic olefin metathesis catalyst, and the at least one adhesion promoter.

Use of at least one adhesion promoter for improving the adhesion of a ROMP composition to at least one substrate material, wherein the at least one adhesion promoter comprises at least one functionalized silane and at least one peroxide, and the ROMP composition comprises at least one cyclic olefin, at least one cyclic olefin metathesis catalyst, and the at least one adhesion promoter.

Use of at least one adhesion promoter for improving the adhesion of a ROMP composition to at least one substrate material, wherein the at least one adhesion promoter comprises at least one functionalized silane and at least one dialkyl peroxide, and the ROMP composition comprises at least one cyclic olefin and at least one cyclic olefin metathesis catalyst.

Use of at least one adhesion promoter for improving the adhesion of a ROMP composition to at least one substrate material, wherein the at least one adhesion promoter comprises at least one functionalized silane and at least one dialkyl peroxide, and the ROMP composition comprises at least one cyclic olefin, at least one cyclic olefin metathesis catalyst, and the at least one adhesion promoter.

A ROMP composition, comprising: a cyclic olefin metathesis catalyst; a cyclic olefin; a functionalized silane; and a peroxide.

A ROMP composition, comprising: at least one cyclic olefin metathesis catalyst; at least one cyclic olefin; at least one functionalized silane; and at least one peroxide. An adhesion promoter composition, comprising: a functionalized silane of the formula

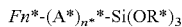

wherein,
Fn* is a functional group selected from acryloyl, methacryloyl, allyl, vinyl, alkenyl, cycloalkenyl, or norbornenyl;
A* is a divalent linking group selected from hydrocarbylene, substituted hydrocarbylene, heteroatom-containing hydrocarbylene, or substituted heteroatom-containing hydrocarbylene;
n* is 0 or 1; and
R* is selected from hydrocarbyl, substituted hydrocarbyl, heteroatom-containing hydrocarbyl, or substituted heteroatom-containing hydrocarbyl; and a peroxide.

An adhesion promoter composition, comprising: at least one functionalized silane of the formula

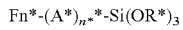

wherein,
Fn* is a functional group selected from acryloyl, methacryloyl, allyl, vinyl, alkenyl, cycloalkenyl, or norbornenyl;
A* is a divalent linking group selected from hydrocarbylene, substituted hydrocarbylene, heteroatom-containing hydrocarbylene, or substituted heteroatom-containing hydrocarbylene;
n* is 0 or 1; and
R* is selected from hydrocarbyl, substituted hydrocarbyl, heteroatom-containing hydrocarbyl, or substituted heteroatom-containing hydrocarbyl; and at least one peroxide.

A method for improving the adhesion of a ROMP composition to a substrate material, comprising: combining a functionalized silane and a peroxide with a cyclic olefin and a cyclic olefin metathesis catalyst to form the ROMP composition, wherein the cyclic olefin may be functionalized or unfunctionalized, and may be substituted or unsubstituted; contacting the ROMP composition with the substrate material; and subjecting the ROMP composition to conditions effective to promote a ROMP reaction of the cyclic olefin in the presence of the cyclic olefin metathesis catalyst, the functionalized silane, the peroxide, and the substrate material.

A method for improving the adhesion of a ROMP composition to at least one substrate material, comprising: combining at least one functionalized silane and at least one peroxide with at least one cyclic olefin and at least one cyclic olefin metathesis catalyst to form the ROMP composition, wherein the at least one cyclic olefin may be functionalized or unfunctionalized, and may be substituted or unsubstituted; contacting the ROMP composition with the at least one substrate material; and subjecting the ROMP composition to conditions effective to promote a ROMP reaction of the at least one cyclic olefin in the presence of the at least one cyclic olefin metathesis catalyst, the at least one functionalized silane, the at least one peroxide, and the at least one substrate material.

An article of manufacture, comprising: a cyclic olefin metathesis catalyst, a cyclic olefin, a functionalized silane, a peroxide, and a substrate material.

An article of manufacture, comprising: at least one cyclic olefin metathesis catalyst, at least one cyclic olefin, at least one functionalized silane, at least one peroxide, and at least one substrate material.

Use of an adhesion promoter for improving the adhesion of a ROMP composition to at least one substrate material, wherein the adhesion promoter comprises a functionalized silane and a peroxide, and the ROMP composition comprises a cyclic olefin and a cyclic olefin metathesis catalyst.

Use of at least one adhesion promoter for improving the adhesion of a ROMP composition to at least one substrate material, wherein the at least one adhesion promoter comprises at least one functionalized silane and at least one peroxide, and the ROMP composition comprises at least one cyclic olefin and at least one cyclic olefin metathesis catalyst.

While the invention is of particular benefit for ring-opening metathesis polymerization (ROMP) reactions, it may also find use in combination with other metathesis reactions, such as a ring-opening cross metathesis reaction, a cross metathesis reaction, a self-metathesis reaction, an ethenolysis reaction, an alkenolysis reaction, or an acyclic diene metathesis polymerization reaction, as well as combinations of such metathesis reactions.

These and other aspects of the invention will be apparent to the skilled artisan in light of the following detailed description and examples.

DETAILED DESCRIPTION OF THE DISCLOSURE

Terminology and Definitions

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl," and "aralkyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO⁻), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—NH$_2$), cyano cyanato thiocyanato (—S—C formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N (alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N (aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O⁻), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl —SO$_2$—N(H) alkyl), $C_1$-$C_{24}$ dialkylaminosulfonyl —SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O$^-$)$_2$), phosphinato (—P(O)(O$^-$), phospho (—PO$_2$), and phosphino (—PH$_2$); and the hydrocarbyl moieties C$_1$-C$_{24}$ alkyl (preferably C$_1$-C$_{12}$ alkyl, more preferably C$_1$-C$_6$ alkyl), C$_2$-C$_{24}$ alkenyl (preferably C$_2$-C$_{12}$ alkenyl, more preferably C$_2$-C$_6$ alkenyl), C$_2$-C$_{24}$ alkynyl (preferably C$_2$-C$_{12}$ alkynyl, more preferably C$_2$-C$_6$ alkynyl), C$_5$-C$_{24}$ aryl (preferably C$_5$-C$_{14}$ aryl), C$_6$-C$_{24}$ alkaryl (preferably C$_6$-C$_{16}$ alkaryl), and C$_6$-C$_{24}$ aralkyl (preferably C$_6$-C$_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the above-mentioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "substrate material," as used herein, is intended to generally mean any material that the resin compositions of the invention may be contacted with, applied to, or have the substrate material incorporated into the resin. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable substrate materials include metallic density modulators, microparticulate density modulators, such as microspheres, and macroparticulate density modulators, such as glass or ceramic beads. In one embodiment a substrate material is glass microspheres. In one embodiment a substrate material is glass fabric. In one embodiment a substrate material is glass reinforcing materials, such as filaments, fibers, rovings, mats, weaves, fabrics, knitted material, cloth or other known structures.

In one embodiment a substrate material is unsized glass fabric. In one embodiment a substrate material is unsized glass reinforcing material, such as filaments, fibers, rovings, mats, weaves, fabrics, knitted material, cloth or other known structures. In one embodiment a substrate material is unsized glass microspheres. For example, commercially available glass reinforcing materials and/or commercially available glass fabrics and/or commercially available glass microspheres may be treated with or contain a sizing formulation or a sizing composition. Commercially available glass reinforcing materials and/or commercially available glass fabrics and/or commercially available glass microspheres that have been treated with or contain a sizing formulation or sizing composition can be cleaned of the sizing formulation or sizing composition, for example, by heating the glass reinforcing materials and/or glass fabric and/or glass microspheres at an elevated temperature and for a period of time (e.g., at about 250° C. for one-half hour) sufficient to remove the sizing formulation or sizing composition, thereby preparing unsized glass reinforcing materials and/or unsized glass fabric and/or unsized glass microspheres.

In the present invention it is particularly advantageous to use unsized glass reinforcing materials and/or unsized glass fabrics and/or unsized glass microspheres as the substrate material. Commerically available glass microspheres may be unsized (i.e., have not been treated with a sizing formulation or sizing composition or do not contain a sizing formulation or sizing composition) or sized (i.e., have been treated with a sizing formulation or sizing composition or do contain a sizing formulation or sizing composition.

The terms "olefin metathesis catalyst" and "cyclic olefin metathesis catalyst" and "metathesis catalyst" and "catalyst" are used interchangeably herein.

Adhesion Promoter

The adhesion promoter of the invention generally comprises a functionalized silane and a peroxide. While any functionalized silane and any peroxide may be utilized, provided the improvements described herein are obtained, functionalized silanes having the formula Fn*-(A*)$_{n*}$*-Si(OR*)$_3$, wherein Fn* is a functional group; A* is a divalent linking group; n* is 0 or 1; and R* is selected from hydrocarbyl, substituted hydrocarbyl, heteroatom-containing hydrocarbyl, or substituted heteroatom-containing hydrocarbyl have been found to be particularly useful. In more particular aspects, R* may be selected from C$_1$-C$_{20}$ alkyl, C$_5$-C$_{20}$ aryl, C$_6$-C$_{20}$ aralkyl, C$_5$-C$_{12}$ cycloalkyl, C$_2$-C$_{20}$ alkoxyalkyl or C$_1$-C$_{20}$ acyl. Suitable functional groups that are reactive in the presence of radical groups include acrylate, methacrylate, allyl, vinyl, alkene, cycloalkene, or norbornene. In more particular aspects, the functionalized silane may be a C$_1$-C$_{12}$ alkoxy silane or C$_1$-C$_{12}$ alkoxy silane having a C$_1$-C$_{12}$ alkylene divalent linking group, the functionalized silane having a functional group selected from acrylate, methacrylate, alkene, cycloalkene, or norbornene. Of these, methacrylate and norbornene functional groups are of particular advantage.

Examples of functional groups (Fn*) are methacrylate (methacryloyl or methacryl) and acrylate (acryloyl or acryl). Examples of functional groups (Fn*) are allyl, vinyl, and alkene (alkenyl). Examples of functional groups (Fn*) are allyl and vinyl. An example of a functional group (Fn*) is methacrylate (methacryloyl or methacryl). An example of a functional group (Fn*) is norbornene (norbornenyl). An example of a functional group (Fn*) is acrylate (acryloyl or acryl). An example of a functional group (Fn*) is vinyl. An example of a functional group (Fn*) is allyl. An example of a functional group (Fn*) is alkene (alkenyl). An example of a functional group (Fn*) is methacrylate (methacryloyl) or norbornene (norbornenyl).

Examples of functional groups (Fn*) are methacryloyl and acryloyl. Examples of functional groups (Fn*) are allyl, vinyl, and alkenyl. Examples of functional groups (Fn*) are allyl and vinyl. An example of a functional group (Fn*) is methacryloyl. An example of a functional group (Fn*) is norbornenyl. An example of a functional group (Fn*) is acryloyl. An example of a functional group (Fn*) is vinyl. An example of a functional group (Fn*) is allyl. An example of a functional group (Fn*) is alkenyl. An example of a functional group (Fn*) is methacryloyl or norbornenyl.

Examples of functional groups (Fn*) are methacryl and acryl. Examples of functional groups (Fn*) are allyl, vinyl, and alkenyl. Examples of functional groups (Fn*) are allyl and vinyl. An example of a functional group (Fn*) is methacryl. An example of a functional group (Fn*) is norbornenyl. An example of a functional group (Fn*) is acryl. An example of a functional group (Fn*) is vinyl. An example of a functional group (Fn*) is allyl. An example of a functional group (Fn*) is alkenyl. An example of a functional group (Fn*) is methacryl or norbornenyl.

In one aspect, R* may be selected from $C_1$-$C_4$ alkyl. In one aspect, R* may be selected from methyl, ethyl, n-propyl, isopropyl, or t-butyl, sec-butyl, n-butyl, or isobutyl. In one aspect, R* may be selected from methyl, ethyl, propyl, isopropyl, or n-butyl. In one aspect, R* may be selected from methyl, ethyl, n-propyl, or isopropyl. In one aspect, R* may be selected from methyl, ethyl, or n-propyl. In one aspect, R* may be selected from methyl or ethyl. In one aspect, R* may be selected from methyl. In one aspect, R* may be selected from ethyl.

In one embodiment, the functionalized silane may be a $C_1$-$C_{12}$ alkoxy silane or $C_1$-$C_{12}$ alkoxy silane having a $C_1$-$C_{12}$ alkylene divalent linking group (A*), the functionalized silane having a functional group (Fn*) selected from acryloyl, methacryloyl, alkenyl, cycloalkenyl, or norbornenyl. Of these, methacryloyl and norbornenyl functional groups are of particular advantage.

Linking group (A*) is a typically a divalent hydrocarbon moiety (linker) selected from hydrocarbylene, substituted hydrocarbylene, heteroatom-containing hydrocarbylene, or substituted heteroatom-containing hydrocarbylene. Suitable groups include alkylenes (i.e., —$CH_2$—$)_m$*, wherein m* is an integer typically ranging from 0-24, 1-24, 1-16, 1-12, 1-10, 1-6, 1-4, 1-3, or 1-2), although, in general, such groups may be selected from alkylene and arylalkylene, wherein the alkyl portion of the alkylene and arylalkylene groups can be linear or branched, saturated or unsaturated, cyclic or acyclic, and substituted or unsubstituted. In addition, the aryl portion of the arylalkylene can be substituted or unsubstituted, and hetero atoms and/or functional groups may be present in either the aryl or the alkyl portions of the alkylene and arylalkylene groups. Suitable linking groups include alkyl, substituted alkyl, aryl, substituted aryl, as well as one or more alkyl, substituted alkyl, aryl, and/or substituted aryl groups connected by one or more functional groups, such as ester, ketone, carbamate, ureido, or amino functionalities. An example of a linking group (A*) is (—$CH_2$—$)_m$*, wherein m* is an integer ranging from 0-24, 1-24, 1-16, 1-12, 1-10, 1-6, 1-4, 1-3, or 1-2. An example of a suitable linking group (A*) is alkylene wherein the alkyl portion of the alkylene groups can be linear or branched, saturated or unsaturated, cyclic or acyclic, and substituted or unsubstituted, and hetero atoms and/or functional groups may be present in either the alkyl portions of the alkylene groups. An example of a suitable linking group (A*) is arylalkylene wherein the alkyl portion of the arylalkylene groups can be linear or branched, saturated or unsaturated, cyclic or acyclic, and substituted or unsubstituted and the aryl portion of the arylalkylene can be substituted or unsubstituted, and hetero atoms and/or functional groups may be present in either the aryl or the alkyl portions of the arylalkylene groups. An example of a linking group (A*) is a $C_1$-$C_{12}$ alkylene divalent linking group.

The divalent linking group A* may also be absent, i.e., it is optionally present, such that the functional group (Fn*) may be attached directly to the silicon atom.

In some aspects of the invention, one or more of the carbon atoms of the linking group may carry substituents including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the linking group may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carboimide, carboalkoxy, carbamate, halogen, or pseudohalogen. Similarly, the linker may be substituted with one or more groups such as $C_1$-$C_{20}$ alkyl, aryl, acyl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, arylthio, $C_1$-$C_{20}$ alkylsulfonyl, $C_1$-$C_{20}$ alkylsulfinyl, $C_1$-$C_{20}$ alkylphosphate, and arylphosphate, wherein such groups may be substituted or unsubstituted.

In some aspects of the invention, one or more of the carbon atoms of the linking group (A*) may carry substituents including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the linking group (A*) may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carboimide, carboalkoxy, carbamate, halogen, or pseudohalogen. Similarly, the linker may be substituted with one or more groups such as $C_1$-$C_{20}$ alkyl, aryl, acyl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, arylthio, $C_1$-$C_{20}$ alkylsulfonyl, $C_1$-$C_{20}$ alkylsulfinyl, $C_1$-$C_{20}$ alkylphosphate, and arylphosphate, wherein such groups may be substituted or unsubstituted.

Although suitable radical-reactive silane compounds generally include any silane according to the formula described above, particularly suitable silanes include methacrylate and acrylate silanes, such as gamma-methacryloxypropyltrimethoxysilane (available as Silquest A-174 from Momentive), gamma-methacryloxypropyltriethoxysilane, gamma-acryloxypropyltrimethoxysilane (available as KBM-5103 from Shin-Etsu), and gamma-acryloxypropyltriethoxysilane. In other embodiments, the functionalized silane may be selected from allyl silanes such as allyltrimethoxysilane and allyltriethoxysilane, vinyl silanes such as vinyltrimethoxysilane and vinyltriethoxysilane, alkenyl silanes such as butenyltrimethoxysilane, butenyltriethoxysilane, hexenyltrimethoxysilane, hexenyltriethoxysilane, and the like, cycloalkenyl silanes such as cyclopentenyl silanes (e.g., as derived from the reaction of an isocyanate functionalized silane with a DCPD-alcohol available from Texmark), norbornenyl silanes such as norbornenyltrimethoxysilane, norbornenyltriethoxysilane, norbornenylethyltrimethoxysilane, and norbornenylethyltriethoxysilane, and methacryloxy silanes such as methacryloxypropyltrimethoxysilane and methacryloxypropyltriethoxysilane.

Examples of functionalized silanes having the formula Fn*-(A*)$_{n*}$*-Si(OR*)$_3$ are gamma-methacryloxypropyltrimethoxysilane, allyltrimethoxysilane, vinyltriethoxysilane, and norbornenyltriethoxysilane. Examples of functionalized silanes having the formula Fn*-(A*)$_{n*}$*-Si(OR*)$_3$ are gamma-methacryloxypropyltrimethoxysilane, gamma-methacryloxypropyltriethoxysilane, gamma-acryloxypropyltrimethoxysilane, or gamma-acryloxypropyltriethoxysilane. Examples of functionalized silanes having the formula Fn*-(A*)$_{n*}$*-Si(OR*)$_3$ are gamma-acryloxypropyltrimethoxysilane, or gamma-acryloxypropyltriethoxysilane. Examples of functionalized silanes having the formula Fn*-(A*)$_{n*}$*-Si(OR*)$_3$ are allyltrimethoxysilane, allyltriethoxysilane, vinyltrimethoxysilane, and vinyltriethoxysilane. Examples of functionalized silanes having the formula Fn*-(A*)$_{n*}$*-Si(OR*)$_3$ are allyltrimethoxysilane, allyltriethoxysilane. Examples of functionalized silanes having the formula Fn*-(A*)$_{n*}$*-Si(OR*)$_3$ are vinyltrimethoxysilane, and vinyltriethoxysilane. Examples of functionalized silanes having the formula Fn*-(A*)$_{n*}$*-Si(OR*)$_3$ are alkenyl silanes such as butenyltrimethoxysilane, butenyltriethoxysilane, hexenyltrimethoxysilane, hexenyltriethoxysilane, and the like. Examples of functionalized silanes having the formula Fn*-(A*)$_{n*}$*-Si(OR*)$_3$ are allyltrimethoxysilane, and vinyltriethoxysilane. An example of functionalized silanes having the formula Fn*-(A*)$_{n*}$*-Si(OR*)$_3$ are norbornenyl silanes such as norbornenyltrimethoxysilane, norbornenyltriethoxysilane, norbornenylethyltrimethoxysilane, and norbornenylethyltriethoxysilane. An example of a functionalized silane having the formula Fn*-(A*)$_{n*}$*-Si(OR*)$_3$ is norbornenyltriethoxysilane or norbornenyltrimethoxysilane. An example of a functionalized silane having the formula Fn*-(A*)$_{n*}$*-Si(OR*)$_3$ is norbornenyltriethoxysilane. An example of functionalized silanes having the formula Fn*-(A*)$_{n*}$*-Si(OR*)$_3$ are gamma-methacryloxypropyltrimethoxysilane, and gamma-methacryloxypropyltriethoxysilane. An example of a functionalized silane having the formula Fn*-(A*)$_{n*}$*-Si(OR*)$_3$ is gamma-methacryloxypropyltrimethoxysilane.

Examples of functionalized silanes are gamma-methacryloxypropyltrimethoxysilane, allyltrimethoxysilane, vinyltriethoxysilane, and norbornenyltriethoxysilane. Examples of functionalized silanes are gamma-methacryloxypropyltrimethoxysilane, gamma-methacryloxypropyltriethoxysilane, gamma-acryloxypropyltrimethoxysilane, or gamma-acryloxypropyltriethoxysilane. Examples of functionalized silanes are gamma-acryloxypropyltrimethoxysilane, or gamma-acryloxypropyltriethoxysilane. Examples of functionalized silanes are allyltrimethoxysilane, allyltriethoxysilane, vinyltrimethoxysilane, and vinyltriethoxysilane. Examples of functionalized silanes are allyltrimethoxysilane, allyltriethoxysilane. Examples of functionalized silanes are vinyltrimethoxysilane, and vinyltriethoxysilane. Examples of functionalized silanes are alkenyl silanes such as butenyltrimethoxysilane, butenyltriethoxysilane, hexenyltrimethoxysilane, hexenyltriethoxysilane, and the like. Examples of functionalized silanes are allyltrimethoxysilane, and vinyltriethoxysilane. An example of functionalized silanes are norbornenyl silanes such as norbornenyltrimethoxysilane, norbornenyltriethoxysilane, norbornenylethyltrimethoxysilane, and norbornenylethyltriethoxysilane. An example of a functionalized silane is norbornenyltriethoxysilane. An example of functionalized silanes are gamma-methacryloxypropyltrimethoxysilane, and gamma-methacryloxypropyltriethoxysilane. An example of a functionalized silane is gamma-methacryloxypropyltrimethoxysilane.

The second component of the adhesion promoter is generally any peroxide or equivalent compound capable of generating radical species under reaction polymerization or postcure conditions. Suitable peroxides and other free radical initiators may be found in, e.g., E. T. Denisov et al., Handbook of Free Radical Initiators, (New York: Wiley, 2003). Peroxide compounds that provide the benefits described herein are of particular interest, including, dialkyl peroxides, more particularly dialkyl peroxides having the basic structure $R^{19}OOR^{20}$, in which $R^{19}$ and $R^{20}$ may be the same or different alkyl groups, and wherein the alkyl groups may be substituted and/or contain functional groups. While not limited thereto, preferred peroxides include di-tert-butyl peroxide and dicumyl peroxide.

Additionally, peroxide compounds that provide the benefits described herein are of particular interest, including, dialkyl peroxides, more particularly dialkyl peroxides having the basic structure $R^{19}OOR^{20}$, in which $R^{19}$ and $R^{20}$ may be the same or different alkyl groups wherein the alkyl groups may be substituted or unsubstituted, where the subsitutents may be selected from functional groups, $C_1$-$C_4$ alkyl groups, or aryl groups, further substituted with $C_1$-$C_6$ alkyl, halide, $C_1$-$C_6$ alkoxy or the substituents may be a phenyl group optionally substituted with halide, $C_1$-$C_6$ alkyl, or $C_1$-$C_6$ alkoxy. An example of dialkyl peroxides having the structure $R^{19}OOR^{20}$, in which $R^{19}$ and $R^{20}$ may be the same or different alkyl groups wherein the alkyl groups may be substituted or unsubstituted, where the subsitutents may be selected from functional groups, $C_1$-$C_4$ alkyl groups, or aryl groups, further substituted with $C_1$-$C_6$ alkyl, halide, $C_1$-$C_6$ alkoxy. An example of dialkyl peroxides having the structure $R^{19}OOR^{20}$, in which $R^{19}$ and $R^{20}$ may be the same or different alkyl groups wherein the alkyl groups may be substituted or unsubstituted, where the subsitutents may be selected from $C_1$-$C_4$ alkyl groups, or aryl groups, further substituted with $C_1$-$C_6$ alkyl, halide, $C_1$-$C_6$ alkoxy. An example of dialkyl peroxides having the structure $R^{19}OOR^{20}$, in which $R^{19}$ and $R^{20}$ may be the same or different alkyl groups wherein the alkyl groups may be substituted or unsubstituted, where the subsitutents may be selected from $C_1$-$C_4$ alkyl groups, or aryl groups, further substituted with $C_1$-$C_6$ alkyl. An example of dialkyl peroxides having the structure $R^{19}OOR^{20}$, in which $R^{19}$ and $R^{20}$ may be the same or different alkyl groups wherein the alkyl groups may be substituted or unsubstituted, where the subsitutents may be selected from $C_1$-$C_4$ alkyl groups, or a phenyl group optionally substituted with halide, $C_1$-$C_6$ alkyl, or $C_1$-$C_6$ alkoxy.

An example of dialkyl peroxides having the structure $R^{19}OOR^{20}$, in which $R^{19}$ and $R^{20}$ may be the same or different $C_1$-$C_4$ alkyl groups wherein the $C_1$-$C_4$ alkyl groups may be substituted or unsubstituted, where the subsitutents may be selected from functional groups, $C_1$-$C_4$ alkyl groups, or $C_5$-$C_{14}$ aryl groups, further substituted with $C_1$-$C_6$ alkyl, halide, or $C_1$-$C_6$ alkoxy. An example of dialkyl peroxides having the structure $R^{19}OOR^{20}$, in which $R^{19}$ and $R^{20}$ may be the same or different $C_1$-$C_4$ alkyl groups wherein the $C_1$-$C_4$ alkyl groups may be substituted or unsubstituted, where the subsitutents may be selected from $C_1$-$C_4$ alkyl groups, or $C_5$-$C_{14}$ aryl groups, further substituted with $C_1$-$C_6$ alkyl, halide, or $C_1$-$C_6$ alkoxy. An example of dialkyl peroxides having the structure $R^{19}OOR^{20}$, in which $R^{19}$ and $R^{20}$ may be the same or different $C_1$-$C_4$ alkyl groups wherein the $C_1$-$C_4$ alkyl groups may be substituted or unsubstituted, where the subsitutents may be selected from $C_1$-$C_4$ alkyl groups, or $C_5$-$C_{14}$ aryl groups, further substituted with $C_1$-$C_6$ alkyl. An example of dialkyl peroxides having the structure $R^{19}OOR^{20}$, in which $R^{19}$ and $R^{20}$ may be the same or different $C_1$-$C_4$ alkyl groups wherein the $C_1$-$C_4$ alkyl groups may be substituted or unsubstituted, where the subsitutents may be selected from $C_1$-$C_4$ alkyl groups, or a phenyl group optionally substituted with halide, $C_1$-$C_6$ alkyl, or $C_1$-$C_6$ alkoxy.

An example of dialkyl peroxides having the structure $R^{19}OOR^{20}$, in which $R^{19}$ and $R^{20}$ may be the same or different $C_1$-$C_6$ alkyl groups wherein the $C_1$-$C_6$ alkyl groups may be substituted or unsubstituted, where the subsitutents may be selected from functional groups, $C_1$-$C_4$ alkyl groups, or $C_5$-$C_{14}$ aryl groups, further substituted with $C_1$-$C_6$ alkyl, halide, or $C_1$-$C_6$ alkoxy. An example of dialkyl peroxides having the structure $R^{19}OOR^{20}$, in which $R^{19}$ and $R^{20}$ may be the same or different $C_1$-$C_6$ alkyl groups wherein the $C_1$-$C_6$ alkyl groups may be substituted or unsubstituted, where the subsitutents may be selected from $C_1$-$C_4$ alkyl groups, or $C_5$-$C_{14}$ aryl groups, further substituted with $C_1$-$C_6$ alkyl, halide, or $C_1$-$C_6$ alkoxy. An example of dialkyl peroxides having the structure $R^{19}OOR^{20}$, in which $R^{19}$ and $R^{20}$ may be the same or different $C_1$-$C_6$ alkyl groups wherein the $C_1$-$C_6$ alkyl groups may be substituted or unsubstituted, where the subsitutents may be selected from $C_1$-$C_4$ alkyl groups, or $C_5$-$C_{14}$ aryl groups, further substituted with $C_1$-$C_6$ alkyl. An example of dialkyl peroxides having the structure $R^{19}OOR^{20}$, in which $R^{19}$ and $R^{20}$ may be the same or different $C_1$-$C_6$ alkyl groups wherein the $C_1$-$C_6$ alkyl groups may be substituted or unsubstituted, where the subsitutents may be selected from $C_1$-$C_4$ alkyl groups, or a phenyl group optionally substituted with halide, $C_1$-$C_6$ alkyl, or $C_1$-$C_6$ alkoxy. An example of dialkyl peroxides having the structure $R^{19}OOR^{20}$, in which $R^{19}$ and $R^{20}$, are independently selected from tert-butyl, cumyl, and tert-amyl. An example of dialkyl peroxides having the structure $R^{19}OOR^{20}$, in which $R^{19}$ and $R^{20}$, are independently selected from tert-butyl and cumyl. An example of dialkyl peroxides having the structure $R^{19}OOR^{20}$, in which $R^{19}$ and $R^{20}$, are tert-butyl. An example of dialkyl peroxides having the structure $R^{19}OOR^{20}$, in which $R^{19}$ and $R^{20}$, are cumyl. An example of dialkyl peroxides having the structure $R^{19}OOR^{20}$, in which $R^{19}$ and $R^{20}$, are tert-amyl.

An example of peroxides having the structure $R^{19}OOR^{20}$ are di-tert-butyl peroxide, dicumyl peroxide, di-tert-amyl peroxide, and tert-butyl cumyl peroxide. An example of peroxides having the structure $R^{19}OOR^{20}$ are di-tert-butyl peroxide and dicumyl peroxide. An example of a peroxide having the structure $R^{19}OOR^{20}$ is di-tert-butyl peroxide. An example of a peroxide having the structure $R^{19}OOR^{20}$ is dicumyl peroxide. An example of a peroxide having the structure $R^{19}OOR^{20}$ is di-tert-amyl peroxide. An example of a peroxide having the structure $R^{19}OOR^{20}$ is tert-butyl cumyl peroxide.

An example of peroxides are di-tert-butyl peroxide, dicumyl peroxide, di-tert-amyl peroxide, and tert-butyl cumyl peroxide. An example of peroxides are di-tert-butyl peroxide and dicumyl peroxide. An example of a peroxide is di-tert-butyl peroxide. An example of a peroxide is dicumyl peroxide. An example of a peroxide is di-tert-amyl peroxide. An example of a peroxide is tert-butyl cumyl peroxide.

An example of dialkyl peroxides are di-tert-butyl peroxide, dicumyl peroxide, di-tert-amyl peroxide, and tert-butyl cumyl peroxide. An example of dialkyl peroxides are di-tert-butyl peroxide and dicumyl peroxide. An example of a dialkyl peroxide is di-tert-butyl peroxide. An example of a dialkyl peroxide is dicumyl peroxide. An example of a dialkyl peroxide is di-tert-amyl peroxide. An example of a dialkyl peroxide is tert-butyl cumyl peroxide.

The amounts of functionalized silane and peroxide present in the adhesion promoter may vary over a wide range and are generally independent of each other The relative amounts of each may also vary depending on the manufacturing operation or the particular end-use application. Generally, any level of functionalized silane and any level of peroxide that together produce a desired increase in mechanical properties is of particular interest. When formulated or combined with a resin composition, the concentration of each of the functionalized silane and peroxide typically range from 0.1-10 phr, more particularly between 0.25-2 phr. The concentrations of functionalized silane and peroxide need not be the same to achieve advantageous mechanical properties. In a preferred aspect of the invention, increased mechanical properties may be obtained for resin compositions comprising the adhesion promoter as compared to resin compositions that merely include a silane and/or a peroxide compound rather than the adhesion promoter of the invention.

In one aspect of the invention at least one functionalized silane may be applied to a substrate material before being contacted with a resin composition, wherein the resin composition comprises at least one cyclic olefin and at least one peroxide.

In one aspect of the invention at least one functionalized silane may be applied to a substrate material before being contacted with a ROMP composition, wherein the ROMP composition comprises at least one cyclic olefin, at least one olefin metathesis catalyst, and at least one peroxide.

In one aspect of the invention at least one functionalized silane may be applied to a substrate material before being contacted with a ROMP composition, wherein the ROMP composition comprises at least one cyclic olefin, at least one olefin metathesis catalyst, and at least one dialkyl peroxide.

In one aspect of the invention at least one functionalized silane of the formula $Fn^*-(A^*)_{n^*}*-Si(OR^*)_3$ may be applied to a substrate material before being contacted with a ROMP composition, wherein the ROMP composition comprises at least one cyclic olefin, at least one olefin metathesis catalyst, and at least one peroxide of the formula $R^{19}OOR^{20}$.

In another aspect of the invention the at least one functionalized silane and the at least one peroxide may be formulated or combined with at least one cyclic olefin to form a resin composition, wherein the resin composition is applied to or contacted with a substrate material.

In another aspect of the invention the at least one functionalized silane and the at least one peroxide may be formulated or combined with at least one cyclic olefin and at least one olefin metathesis catalyst to form a ROMP composition, wherein the ROMP composition is applied to or contacted with a substrate material.

In another aspect of the invention the at least one functionalized silane and the at least one dialkyl peroxide may be formulated or combined with at least one cyclic olefin and at least one olefin metathesis catalyst to form a ROMP composition, wherein the ROMP composition is applied to or contacted with a substrate material.

In another aspect of the invention the at least one functionalized silane of the formula $Fn^*-(A^*)_{n^*}*-Si(OR^*)_3$ and the at least one peroxide of the formula $R^{19}OOR^{20}$ may be formulated or combined with at least one cyclic olefin and at least one olefin metathesis catalyst to form a ROMP composition, wherein the ROMP composition is applied to or contacted with a substrate material.

In one embodiment the invention provides a method comprising, contacting at least one substrate material with at least one functionalized silane to form at least one treated substrate material, contacting the at least one treated substrate material with a ROMP composition comprising at least one cyclic olefin, at least one olefin metathesis catalyst, and at least one peroxide, and subjecting the ROMP composition to conditions effective to promote a ROMP reaction of the at least one cyclic olefin in the presence of the at least one olefin metathesis catalyst, the at least one peroxide, and the at least one treated substrate material.

Cyclic Olefin

In addition to the adhesion promoter, described hereinabove, resin compositions disclosed herein include one or more cyclic olefins. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di- or poly-cyclic. The cyclic olefin may generally be any strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a comonomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

(A)

wherein J and $R^A$ are as follows:

$R^A$ is selected from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ aryl sulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^A$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen or phosphorus atom, or through an electron-rich metal or metalloid such as Ge, Sn, As, Sb, Se, Te, etc. With such functional groups, there will normally be an intervening linkage $Z^*$, such that $R^A$ then has the structure —$(Z^*)_n$-Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$-Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefin reactants encompassed by structure (A) may be represented by the structure (B)

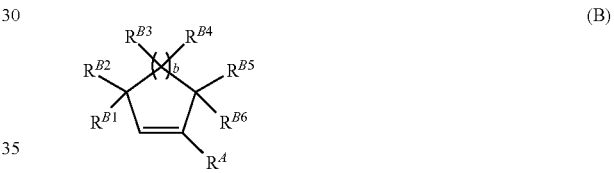

(B)

wherein b is an integer generally although not necessarily in the range of 1 to 10, typically 1 to 5, $R^A$ is as defined above, and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —$(Z^*)_n$-Fn where n, $Z^*$ and Fn are as defined previously, and wherein if any of the $R^{B1}$ through $R^{B6}$ moieties is substituted hydrocarbyl or substituted heteroatom-containing hydrocarbyl, the substituents may include one or more —$(Z^*)_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc. Furthermore, any of the $R^{B1}$, $R^{B2}$, $R^{B3}$, $R^{B4}$, $R^{B5}$, and $R^{B6}$ moieties can be linked to any other of the $R^{B1}$, $R^{B2}$, $R^{B3}$, $R^{B4}$, $R^{B5}$, and $R^{B6}$ moieties to provide a bicyclic or polycyclic olefin, and the linkage may include heteroatoms or functional groups, e.g., the linkage may include an ether, ester, thioether, amino, alkylamino, imino, or anhydride moiety.

Additionally, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety.

The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, l-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc. Monocyclic diene reactants encompassed by structure (A) may be generally represented by the structure (C)

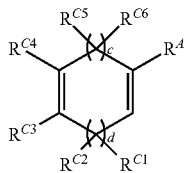

(C)

wherein c and d are independently integers in the range of 1 to about 8, typically 2 to 4, preferably 2 (such that the reactant is a cyclooctadiene), $R^A$ is as defined above, and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be nonhydrogen substituents, in which case the second olefinic moiety is tetrasubstituted. Examples of monocyclic diene reactants include, without limitation, 1,3-cyclopentadiene, 1,3-cyclohexadiene, 1,3-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

Bicyclic and polycyclic olefinic reactants encompassed by structure (A) may be generally represented by the structure (D)

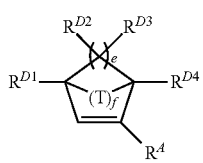

(D)

wherein e is an integer in the range of 1 to 8, typically 2 to 4, f is generally 1 or 2, T is lower alkylene or lower alkenylene, generally substituted or unsubstituted methyl or ethyl, $R^A$ is as defined above, and $R^{D1}$, $R^{D2}$, $R^{D3}$, and $R^{D4}$ are as defined for $R^{B1}$ through $R^{B6}$. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above. Preferred olefinic reactants within this group are in the norbornene family, having the structure (E)

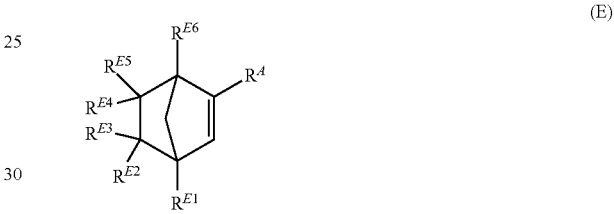

(E)

wherein $R^A$ is as defined above, $R^{E1}$, $R^{E2}$, $R^{E3}$, and $R^{E6}$ have the same definitions as $R^{B1}$ through $R^{B6}$, and $R^{E4}$ and $R^{E5}$ are defined as for $R^{E2}$ and $R^{E3}$, respectively.

As used herein, norbornene means any compound that includes at least one norbornene or substituted norbornene moiety, including without limitation norbornene, substituted norbornene(s), norbornadiene, substituted norbornadiene(s), polycyclic norbornenes, and substituted polycyclic norbornene(s). Norbornenes within this group may be generally represented by the structure (E)

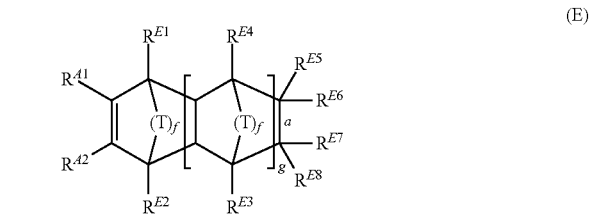

(E)

wherein $R^{A1}$ and $R^{A2}$ are as defined above for structure (A), T is as defined above for structure (D), $R^{E1}$, $R^{E2}$, $R^{E3}$, $R^{E4}$, $R^{E5}$, $R^{E6}$, $R^{E7}$, and $R^{E8}$ are as defined for $R^{B1}$ through $R^{B6}$, and "a" represents a single bond or a double bond, f is generally 1 or 2, "g" is an integer from 0 to 5, and when "a" is a double bond one of $R^{E5}$, $R^{E6}$ and one of $R^{E7}$, $R^{E8}$ is not present.

Furthermore, any of the $R^{E5}$, $R^{E6}$, $R^{E7}$, and $R^{E8}$ moieties can be linked to any of the other $R^{E5}$, $R^{E6}$, $R^{E7}$, and $R^{E8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

More preferred cyclic olefins possessing at least one norbornene moiety have the structure (F):

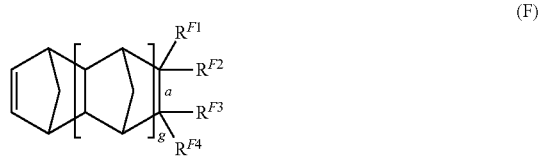

(F)

wherein, $R^{F1}$, $R^{F2}$, $R^{F3}$, $R^{F4}$, are as defined for $R^{B1}$ through $R^{B6}$, and "a" represents a single bond or a double bond, "g" is an integer from 0 to 5, and when "a" is a double bond one of $R^{F1}$, $R^{F2}$ and one of $R^{F3}$, $R^{F4}$ is not present.

Furthermore, any of the $R^{F1}$, $R^{F2}$, $R^{F3}$, and $R^{F4}$ moieties can be linked to any of the other $R^{F1}$, $R^{F2}$, $R^{F3}$, and $R^{F4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

SCHEME 1

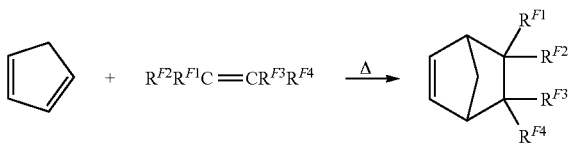

wherein $R^{F1}$ to $R^{F4}$ are as previously defined for structure (F).

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

SCHEME 2

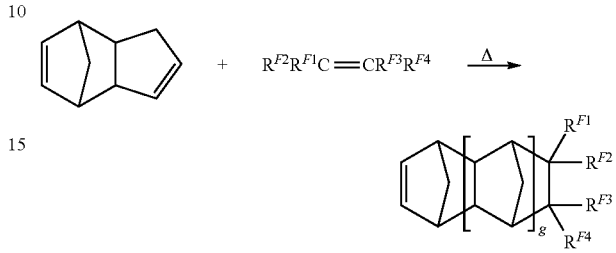

wherein "g" is an integer from 0 to 5, and $R^{F1}$ to $R^{F4}$ are as previously defined for structure (F).

Norbornadiene and higher Diels-Alder adducts thereof similarly can be prepared by the thermal reaction of cyclopentadiene and dicyclopentadiene in the presence of an acetylenic reactant as shown below in Scheme 3:

SCHEME 3

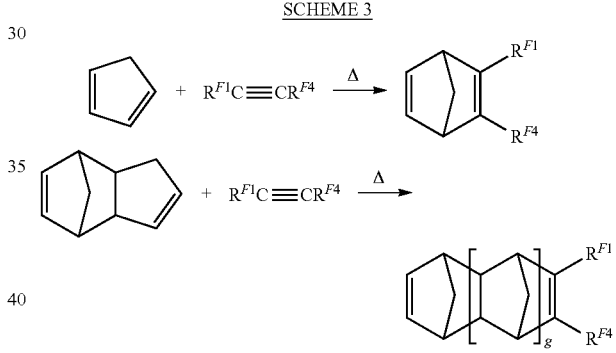

wherein "g" is an integer from 0 to 5, $R^{F1}$ and $R^{F4}$ are as previously defined for structure (F)

Examples of bicyclic and polycyclic olefinic reactants thus include, without limitation, dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-ace tylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dimethoxynorbornene, endo,exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, pentacyclohexadecene, 1,9-octadecadiene, and the like.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous 0 heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, and 5-ethylidene-2-norbornene.

The cyclic olefin may also be substituted—for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein.

The cyclic olefins useful in the methods disclosed herein may be strained or unstrained. It will be appreciated that the amount of ring strain varies for each cyclic olefin compound, and depends upon a number of factors including the size of the ring, the presence and identity of substituents, and the presence of multiple rings Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein.

A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

Examples of cyclic olefins include dicyclopentadiene, tricyclopentadiene, and higher order oligomers of cyclopentadiene, such as cyclopentadiene tetramer, cyclopentadiene pentamer, and the like. Examples of cyclic olefins include dicyclopentadiene, tricyclopentadiene, and higher order oligomers of cyclopentadiene, such as cyclopentadiene tetramer. Examples of cyclic olefins include dicyclopentadiene, tricyclopentadiene, and tetracyclopentadiene. Examples of cyclic olefins include dicyclopentadiene and tricyclopentadiene. An example of a cyclic olefin in dicyclopentadiene. An example of a cyclic olefin is tricyclopentadiene. An example of a cyclic olefin is tetracyclopentadiene.

Olefin Metathesis Catalyst

The olefin metathesis catalyst complex according to the invention is preferably a Group 8 transition metal complex having the structure of formula (I)

in which:

M is a Group 8 transition metal;

$L^1$, $L^2$ and $L^3$ are neutral electron donor ligands;

n is 0 or 1, such that $L^3$ may or may not be present;

m is 0, 1, or 2;

k is 0 or 1;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure —$(W)_n$—$U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety. Furthermore, $R^1$ and $R^2$ may be taken together to form a phenylindenylidene moiety.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M and m are as described above, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines.

Examples of trisubstituted phosphines are of the formula $PR^{H1}$, $R^{H2}$, $R^{H3}$, where $R^{H1}$, $R^{H2}$, and $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine (PMe₃), triethylphosphine (PEt₃), tri-n-butylphosphine (PBu3), tri(ortho-tolyl)phosphine (P-o-tolyl₃), tri-tert-butylphosphine (P-tert-Bu₃), tricyclopentylphosphine (PCyclopentyl₃), tricyclohexylphosphine (PCy₃), triisopropylphosphine (P-i-Pr₃), trioctylphosphine (POct₃), triisobutylphosphine, (P-i-Bu₃), triphenylphosphine (PPh₃), tri(pentafluorophenyl)phosphine (P(C₆F₅)₃), methyldiphenylphosphine (PMePh₂), dimethylphenylphosphine (PMe₂Ph), and diethylphenylphosphine (PEt₂Ph). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like).

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhD, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_6$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^1$ is hydrogen and $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^1$ is hydrogen and $R^2$ is phenyl or vinyl substituted with one or more moieties selected from methyl, ethyl, chloro, bromo, iodo, fluoro, nitro, dimethylamino, methyl, methoxy, and phenyl. Optimally, $R^1$ is hydrogen and $R^2$ is phenyl or —CH=C(CH₃)₂.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940 to Grubbs et al. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein $L^1$ is a carbene ligand having the structure of formula (II)

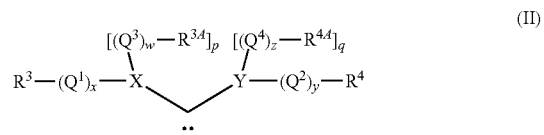

(II)

such that the complex may have the structure of formula (III)

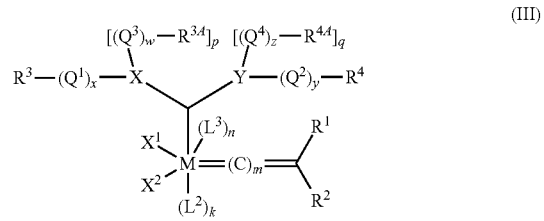

(III)

wherein M, m, n, $X^1$, $X^2$, $L^2$, $L^3$, $R^1$, and $R^2$ are as defined for the first group of catalysts, and the remaining substituents are as follows.

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N.

$Q^1$, $Q^2$, $Q^3$ and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group.

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl.

In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety. Furthermore, $R^1$ and $R^2$ may be taken together to form a phenylindenylidene moiety. Moreover, $X^1$, $X^2$, $L^2$, $L^3$, X and Y may be further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, and $R^{4A}$ can be) taken together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

A particular class of carbene ligands having the structure of formula (II), where $R^{3A}$ and $R^{4A}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands.

Preferably, $R^{3A}$ and $R^{4A}$ are linked to form a cyclic group so that the carbene ligand has the structure of formula (IV)

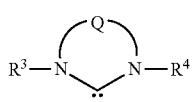

(IV)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene ligands and acyclic diaminocarbene ligands suitable as $L^1$ thus include, but are not limited to, the following where DIPP is diisopropylphenyl and Mes is 2,4,6-trimethylphenyl:

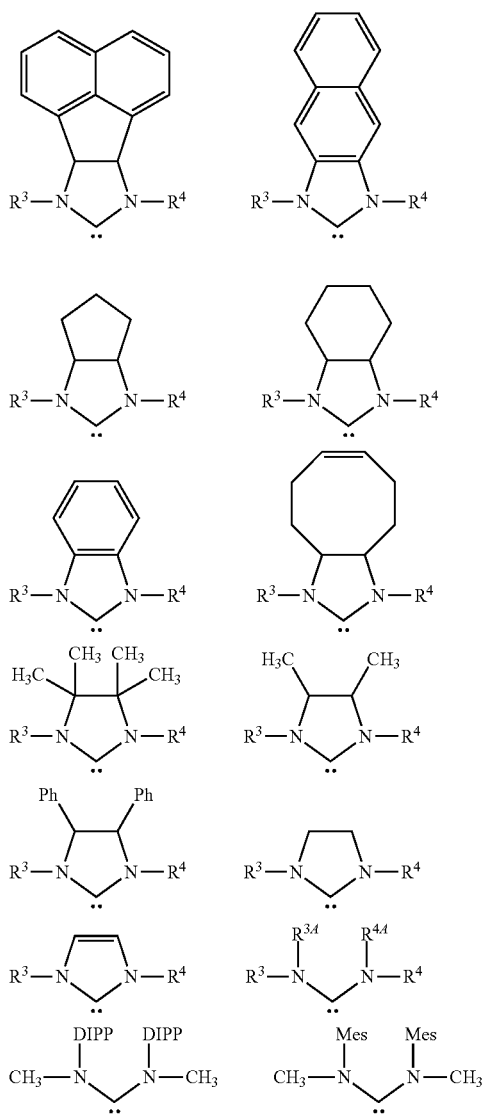

Additional examples of N-heterocyclic carbene (NHC) ligands and acyclic diaminocarbene ligands suitable as $L^1$ thus include, but are not limited to the following:

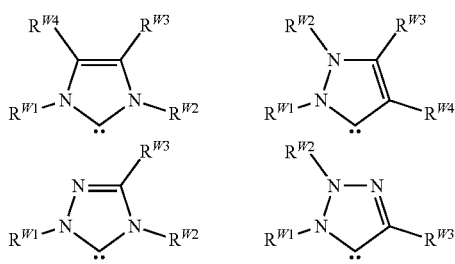

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139, the contents of each are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula (V)

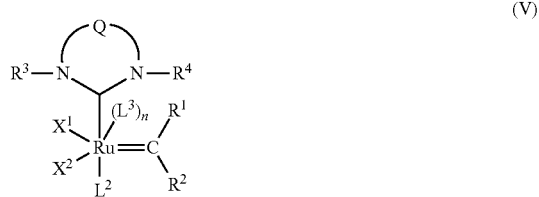

In a more preferred embodiment, Q is a two-atom linkage having the structure —$CR^{11}R^{12}$—$CR^{13}R^{14}$— or —$CR^{11}$═$CR^{13}$—, preferably —$CR^{11}R^{12}$—$CR^{13}R^{14}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers.

Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., 2,4,6-trimethylphenyl).

In a third group of catalysts having the structure of formula (I), M, m, n, $X^1$, $X^2$, $R^1$, and $R^2$ are as defined for the first group of catalysts, $L^1$ is a strongly coordinating neutral electron donor ligand such as any of those described for the first and second group of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substitutent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph$_2$)-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N (CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to $O_2C(CH_2)_2P(Ph)(CH_2)_2P(Ph)(CH_2)_2CO_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

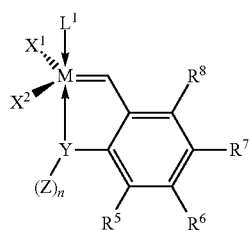
(VII)

wherein,
M is a Group 8 transition metal, particularly Ru or Os, or, more particularly, Ru;
$X^1$, $X^2$, and $L^1$ are as previously defined herein;
Y is a heteroatom selected from N, O, S, and P; preferably Y is O or N;
$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein A and Fn have been defined above; and any combination of $R^5$, $R^6$, $R^7$, and $R^8$ can be linked to form one or more cyclic groups;
n is 1 or 2, such that n is 1 for the divalent heteroatoms O or S, and n is 2 for the trivalent heteroatoms N or P;
Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ are linked to a support. Additionally, $R^5$, $R^6$, $R^7$, $R^8$, and Z may independently be thioisocyanate, cyanato, or thiocyanato.

In general, Grubbs-Hoveyda complexes useful in the invention contain a chelating alkylidene moiety that may be derived from a ligand precursor of the formula

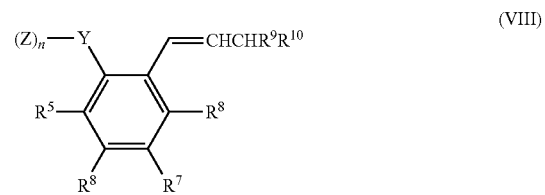
(VIII)

wherein Y, n, Z, $R^5$, $R^6$, $R^7$, and $R^8$ are as previously defined herein;
$R^9$ and $R^{10}$ are each, independently, selected from hydrogen or a substituent group selected from alkyl, aryl, alkoxy, aryloxy, $C_2$-$C_{20}$ alkoxycarbonyl, or $C_1$-$C_{20}$ trialkylsilyl, wherein each of the substituent groups is substituted or unsubstituted; and wherein any combination or combinations of Z, Y, $R^5$, $R^6$, $R^7$, $R^8$, $R^9$, and $R^{10}$ may be linked to a support.

Examples of complexes comprising Grubbs-Hoveyda ligands suitable in the invention include:

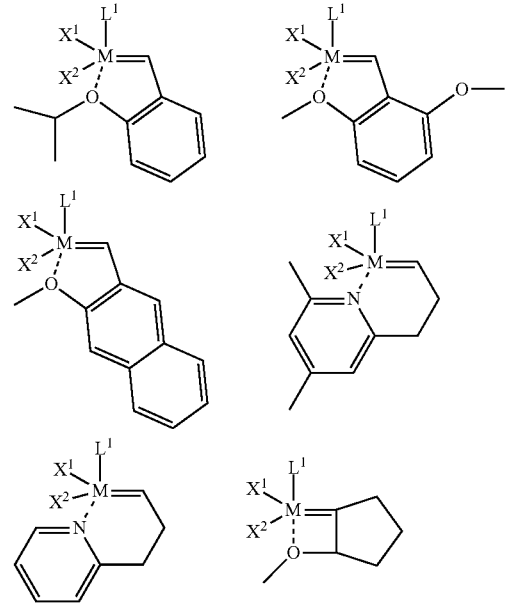

wherein, $L^1$, $X^1$, $X^2$, and M are as described for any of the other groups of catalysts. Suitable chelating carbenes and carbene precursors are further described by Pederson et al. (U.S. Pat. Nos. 7,026,495; 6,620,955) and Hoveyda et al. (U.S. Pat. No. 6,921,735; WO0214376).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

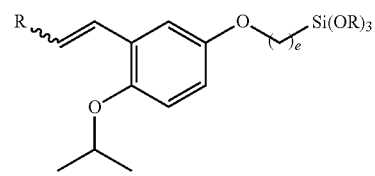

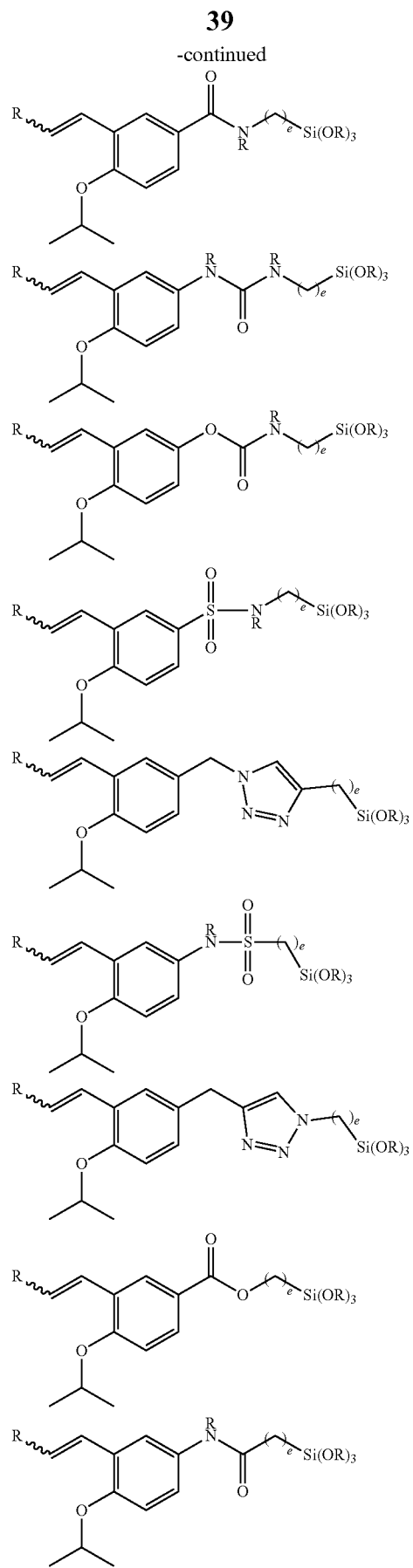
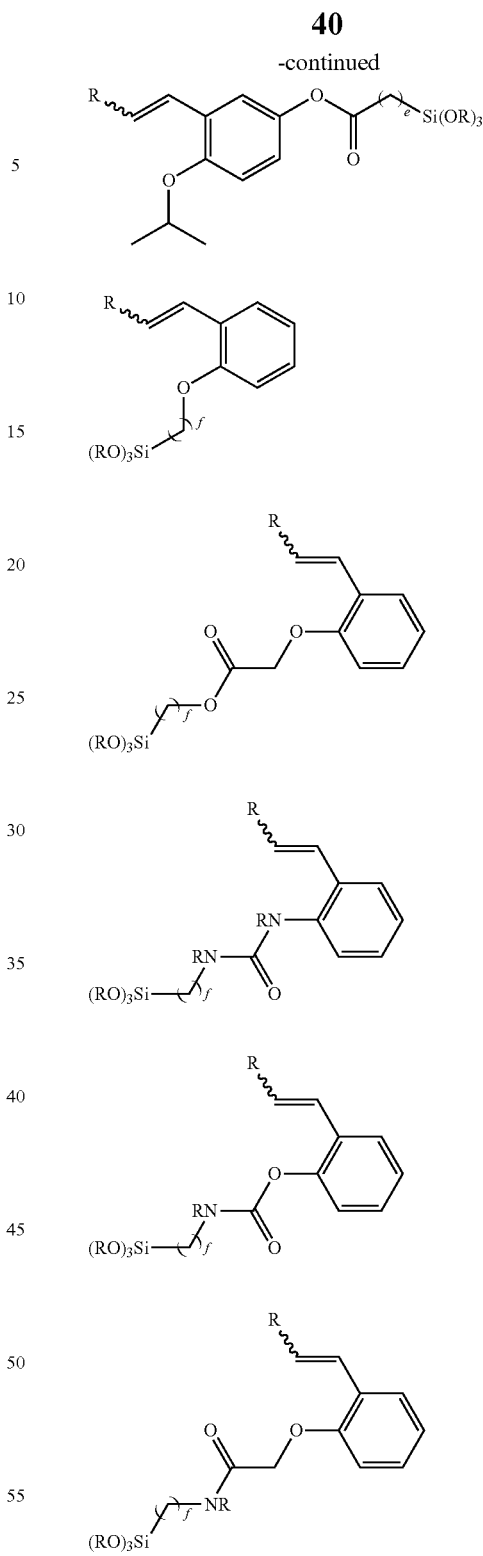

Further examples of complexes having linked ligands include those having linkages between a neutral NHC ligand and an anionic ligand, a neutral NHC ligand and an alkylidine ligand, a neutral NHC ligand and an L² ligand, a neutral NHC ligand and an L³ ligand, an anionic ligand and an alkylidine ligand, and any combination thereof. While the possible structures are too numerous to list herein, some suitable structures based on formula (III) include:

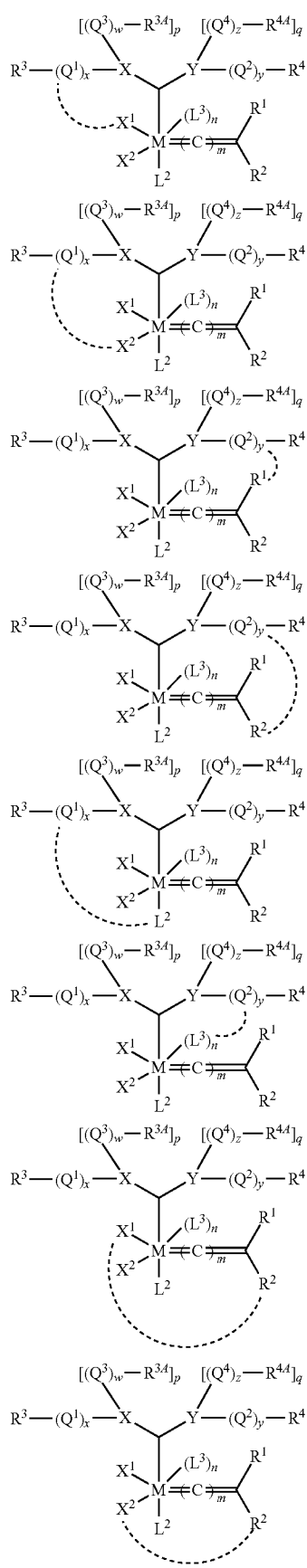
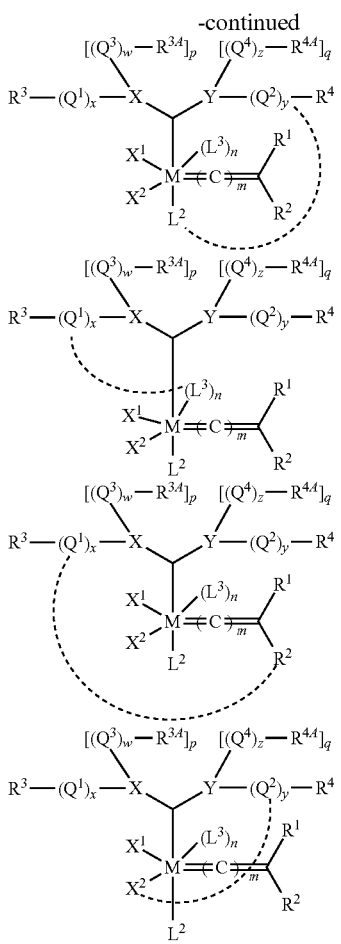

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14, are penta-coordinated, and are of the general formula (XII)

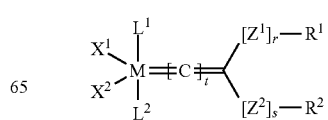

(IX)

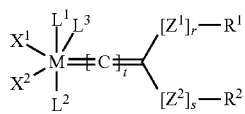
(X)

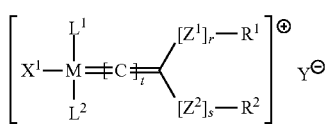
(XI)

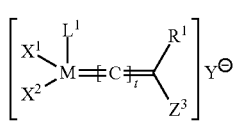
(XII)

wherein: $X^1$, $X^2$, $L^1$, $L^2$, n, $L^3$, $R^1$, and $R^2$ are as defined for any of the previously defined four groups of catalysts; r and s are independently zero or 1; t is an integer in the range of zero to 5; Y is any non-coordinating anion (e.g., a halide ion, $BF_4^-$, etc.); $Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, and —S(=O)$_2$—; $Z^3$ is any cationic moiety such as —P($R^2$)$_3^+$ or —N($R^2$)$_3^+$; and any two or more of $X^1$, $X^2$, $L^1$, $L^2$, $L^3$, n, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, n, $L^3$, $Z^1$, $Z^2$, $Z^3$, $R^1$, and $R^2$ may be attached to a support.

Additionally, another group of olefin metathesis catalysts that may be used in the invention disclosed herein, is a Group 8 transition metal complex having the structure of formula (XIII):

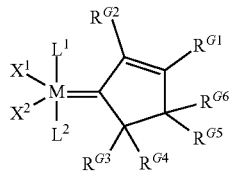
(XIII)

wherein M is a Group 8 transition metal, particularly ruthenium or osmium, or more particularly, ruthenium;

$X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula XIII is a Group 8 transition metal complex of formula (XIV):

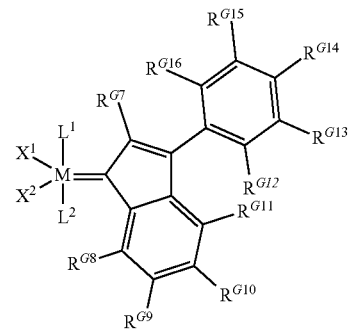
(XIV)

wherein M, $X^1$, $X^2$, $L^1$, $L^2$, are as defined above for Group 8 transition metal complex of formula XIII; and $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ are as defined above for $R^{G1}$, $R^{G2}$, $R^{G3}$, $R^{G4}$, $R^{G5}$, and $R^{G6}$ for Group 8 transition metal complex of formula XIII or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be linked together to form a cyclic group, or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be attached to a support.

Additionally, another preferred embodiment of the Group 8 transition metal complex of formula XIII is a Group 8 transition metal complex of formula (XV):

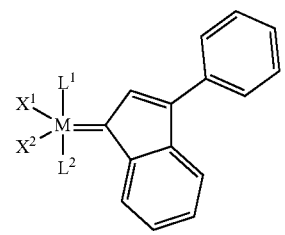
(XV)

wherein M, $X^1$, $X^2$, $L^1$, $L^2$, are as defined above for Group 8 transition metal complex of formula XIII.

Additionally, another group of olefin metathesis catalysts that may be used in the invention disclosed herein, is a Group 8 transition metal complex comprising a Schiff base ligand having the structure of formula (XVI):

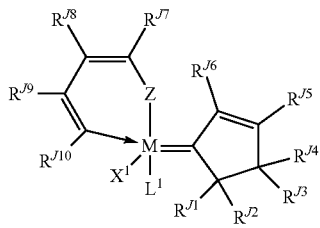

(XVI)

wherein M is a Group 8 transition metal, particularly ruthenium or osmium, or more particularly, ruthenium;

$X^1$, and $L^1$ are as defined for the first and second groups of catalysts defined above;

Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula (XVI) is a Group 8 transition metal complex comprising a Schiff base ligand having the structure of formula (XVII):

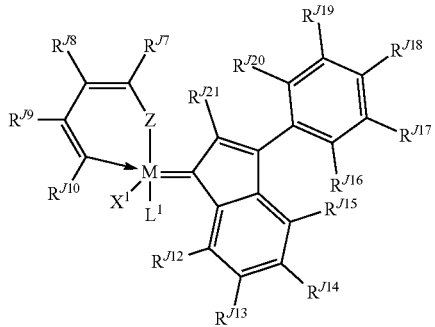

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula XVI; and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula XVI, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Another preferred embodiment of the Group 8 transition metal complex of formula (XVI) is a Group 8 transition metal complex comprising a Schiff base ligand having the structure of formula (XVIII):

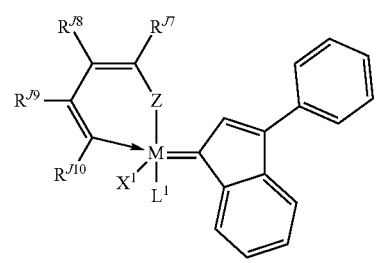

(XVIII)

wherein M, $X^1$, $L^1$, Z, $R^{J7}$, $R^{J8}$, $R^{J9}$, $R^{J10}$, and $R^{J11}$, are as defined above for Group 8 transition metal complex of formula (XVI).

Additionally, another group of olefin metathesis catalysts that may be used in the invention disclosed herein, is a Group 8 transition metal complex comprising a Schiff base ligand having the structure of formula (XIX):

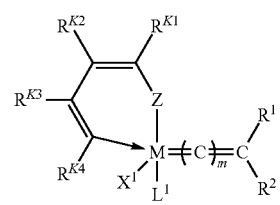

(XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{K5}$, $PR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$, and $R^{K5}$ may be attached to a support.

In addition, catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_1$-$C_{20}$ alkyl, $C_3$-$C_{10}$ cycloalkyl, aryl, benzyl and $C_2$-$C_7$ alkenyl; and silicon compounds represented by the formula $SiR^{Y6}R^{Y7}R^{Y8}R^{Y9}$ wherein each of $R^{Y6}$, $R^7$, $R^8$, $R^{Y9}$ is independently selected from the group consisting of hydrogen, halogen, $C_1$-$C_{20}$ alkyl, halo, $C_1$-$C_7$ alkyl, aryl, heteroaryl, and vinyl. In addition, catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, $HOClO$, $HOClO_2$ and $HOIO_3$. In addition, catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO2010/037550; and U.S. patent application Ser. Nos. 12/303,615; 10/590,380; 11/465,651 (Publication No.: US 2007/0043188); and Ser. No. 11/465,651 (Publication No.: US 2008/0293905 Corrected Publication); and European Pat. Nos. EP1757613B1 and EP1577282B1.

Non-limiting examples of catalysts that may be used to prepare supported complexes and in the reactions disclosed herein include the following, some of which for convenience are identified throughout this disclosure by reference to their molecular weight:

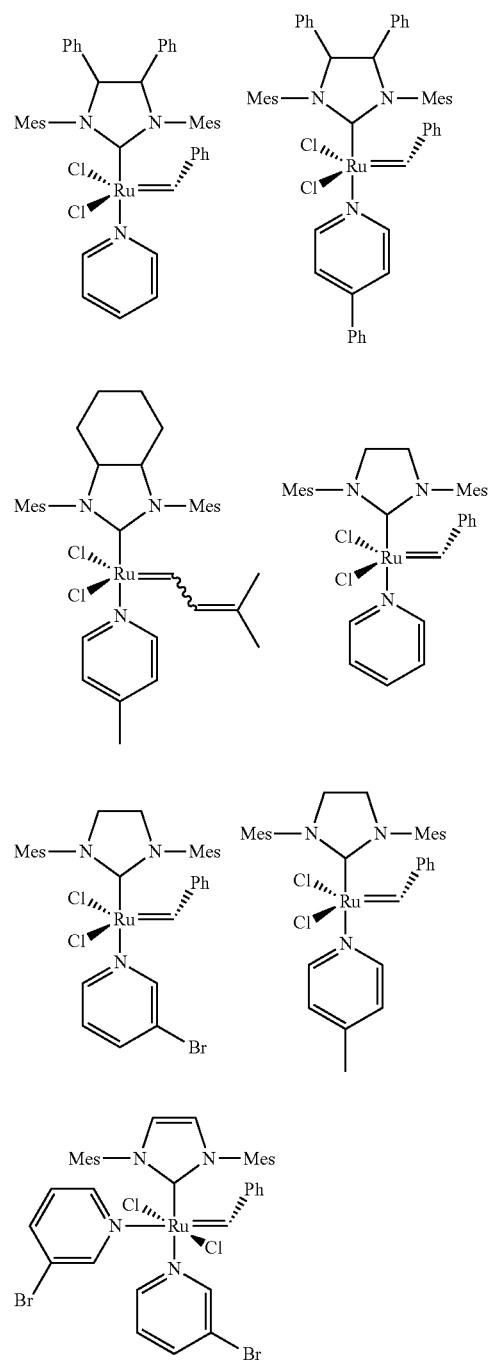

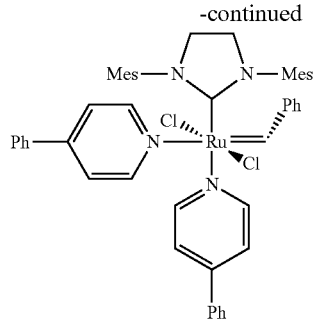
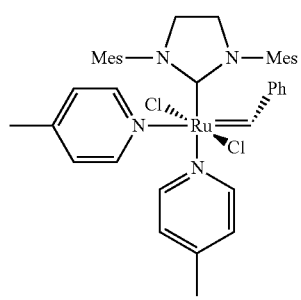
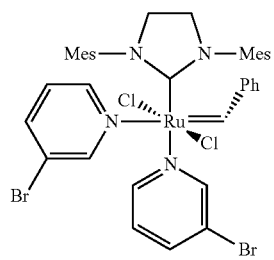
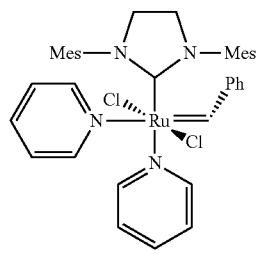
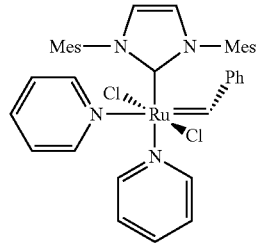
C827
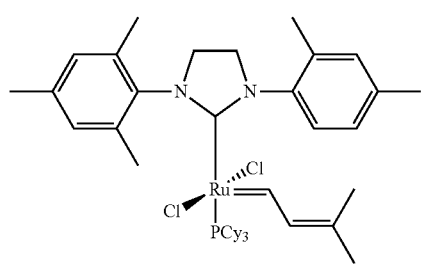
C859
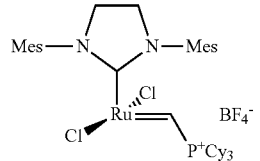
C841-n
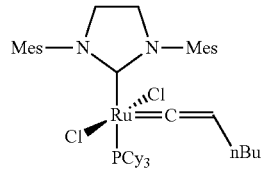
C884
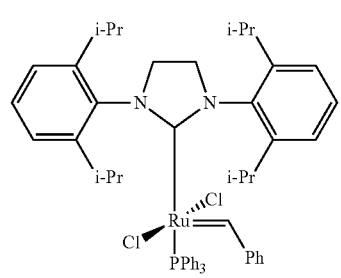
C916
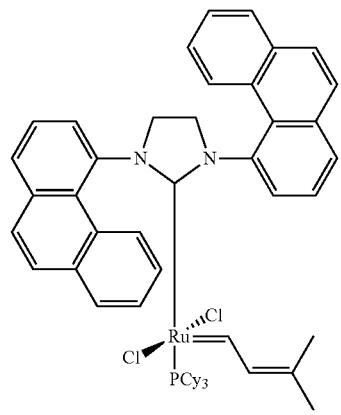
C965-p
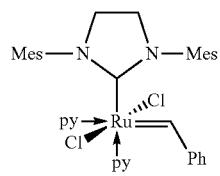
C727
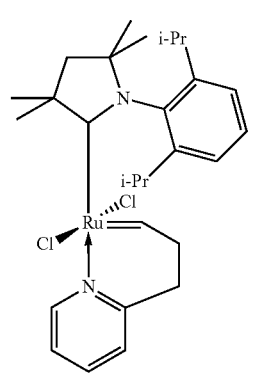
C577

-continued
C646
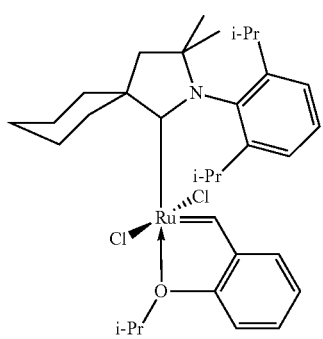
C701
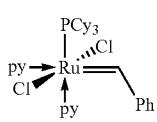
C767-m
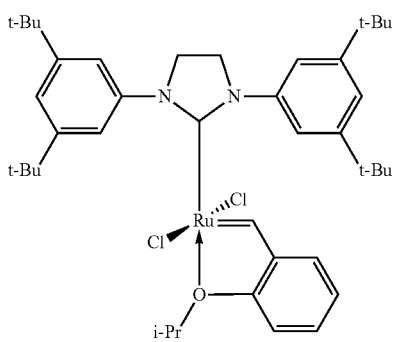
C811
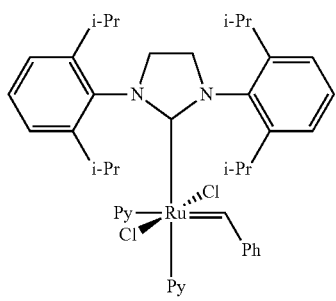
C801
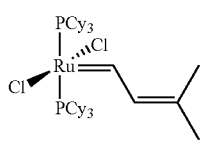
C838
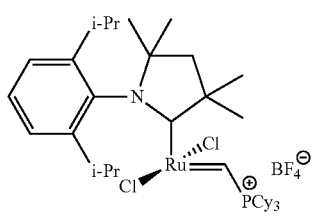
-continued
C712
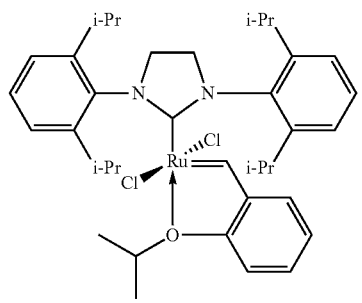
C933
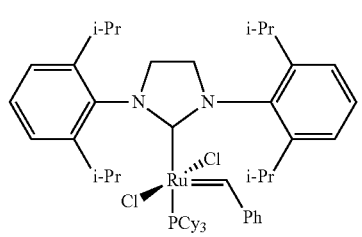
C824
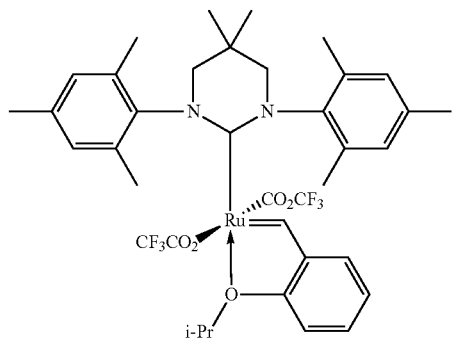
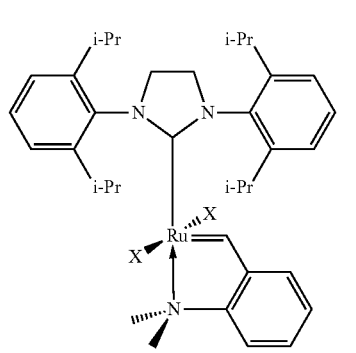
C697 (X = Cl)
C785 (X = Br)
C879 (X = I)
C601
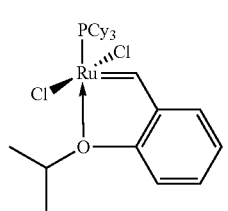

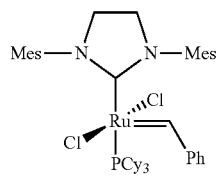
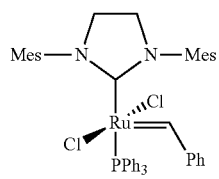
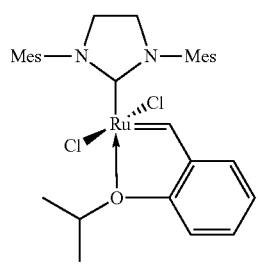
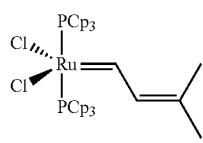
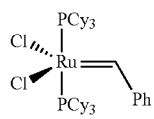
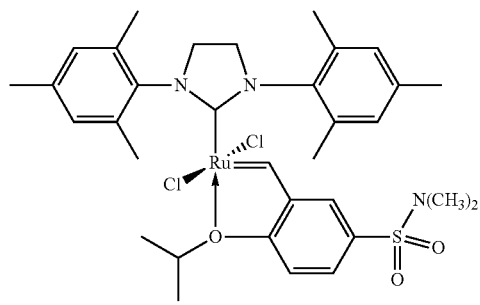
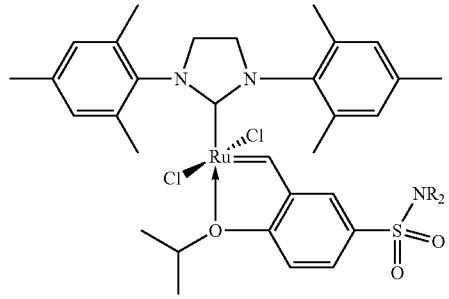
C848
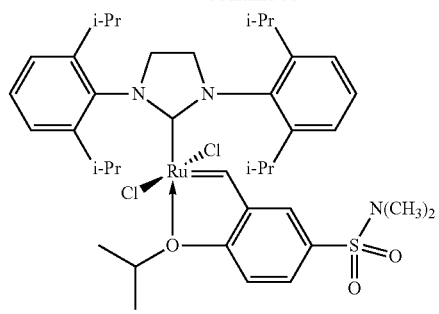
C831
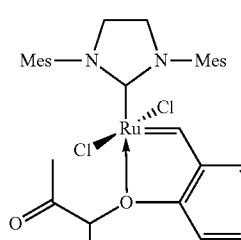
C627
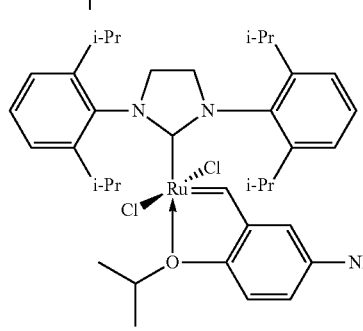
C716
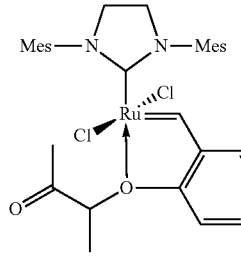
C823
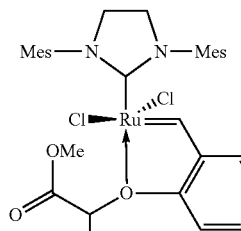
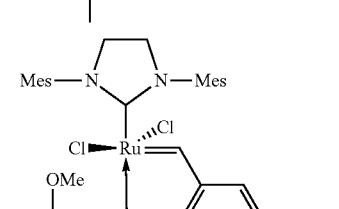
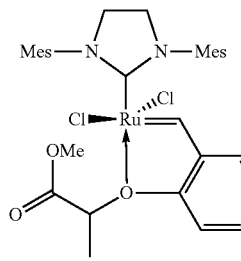

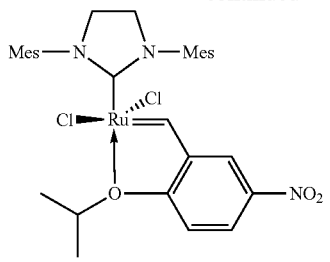
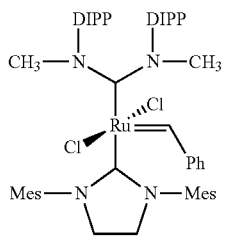
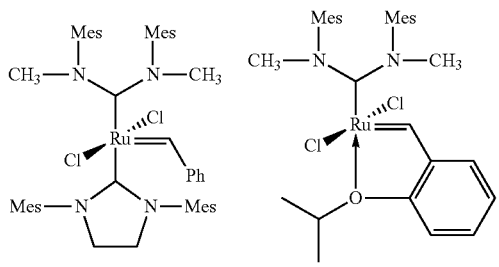
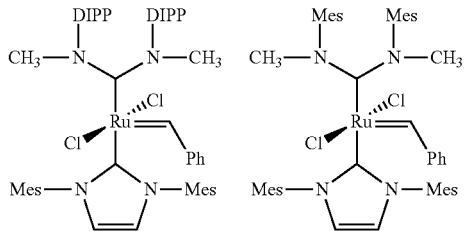
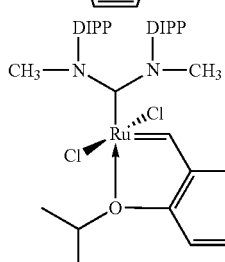
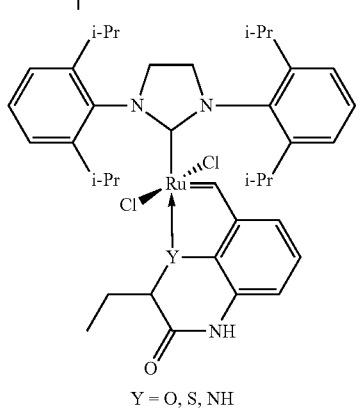

Y = O, S, NH

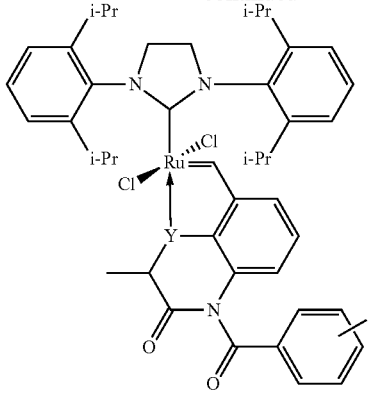

Y = O, S, NH

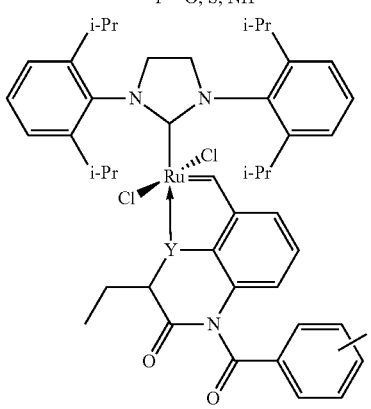

Y = O, S, NH

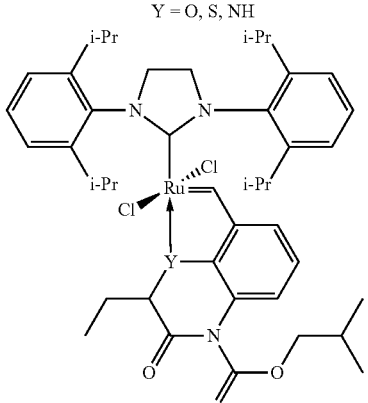

Y = O, S, NH

In the molecular structures and formulae herein, Ph represents phenyl, Cy represents cyclohexyl, Cp represents cyclopentyl, Me represents methyl, nBu and Bu represents n-butyl, t-Bu represents tert-butyl, i-Pr represents isopropyl, py represents pyridine (coordinated through the N atom), Mes represents mesityl (i.e., 2,4,6-trimethylphenyl), DIPP and DiPP represents 2,6-diisopropylphenyl, and MiPP represents 2-isopropylphenyl.

Further examples of catalysts useful to prepare supported complexes and in the reactions disclosed herein include the following: ruthenium (II) dichloro (3-methyl-2-butenylidene) bis(tricyclopentyl-phosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) [1,3-bis-(2,4,6-trimethylphenyl)-2-imidazolidinylidene)

dichloro (phenylmethylene) (triphenylphosphine) (C830), and ruthenium (II) dichloro (phenylvinylidene) bis(tricyclohexylphosphine) (C835); ruthenium (II) dichloro (tricyclohexylphosphine) (o-isopropoxyphenylmethylene) (C601), and ruthenium (II) (1, 3-bis-(2, 4, 6,-trimethylphenyl)-2-imidazolidinylidene) dichloro (phenylmethylene) (bis 3-bromopyridine (C884)); [1,3-bis-(2,4,6-trimethylphenyl)-2-imidazolidinylidene]dichloro(o-isopropoxyphenylmethylene)ruthenium(II) (C627); [1,3-bis-(2,4,6-trimethylphenyl)-2-imidazolidinylidene] dichloro (benzylidene) (triphenylphosphine) ruthenium(II) (C831); [1,3-bis-(2,4,6-trimethylphenyl)-2-imidazolidinylidene] dichloro (benzylidene)(methyldiphenylphosphine)ruthenium(II) (C769); [1,3-bis-(2,4,6-trimethylphenyl)-2-imidazolidinylidene]dichloro(benzylidene)(tricyclohexylphosphine)ruthenium(II) (C848); [1,3-bis-(2,4,6-trimethylphenyl)-2-imidazolidinylidene] dichloro(benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(triphenylphosphine)ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene] dichloro(3-methyl-2-butenylidene)(diethylphenylphosphine)ruthenium (II) (C713); [1,3-bis-(2,4,6-trimethylphenyl)-2-imidazolidinylidene] dichloro (3-methyl-2-butenylidene) (tri-n-butylphosphine)ruthenium(II) (C749); [1,3-bis-(2,4,6-trimethylphenyl)-2-imidazolidinylidene] dichloro(phenylindenylidene)(triphenylphosphine)ruthenium(II) (C931); [1,3-bis-(2,4,6-trimethylphenyl)-2-imidazolidinylidene] dichloro (phenylindenylidene) (methylphenylphosphine) ruthenium(II) (C869); [1,3-bis-(2,4,6-trimethylphenyl)-2-imidazolidinylidene] dichloro (phenylindenylidene) (tricyclohexylphosphine) ruthenium (II) (C949); [1,3-bis-(2,4,6-trimethylphenyl)-2-imidazolidinylidene] dichloro(phenylindenylidene)(diethylphenylphosphine)ruthenium(II) (C835); [1,3-bis-(2,4,6-trimethylphenyl)-2-imidazolidinylidene]dichloro (phenylindenylidene)(tri-n-butylphosphine)ruthenium(II) (C871); and [1,3-bis-(2,4,6-trimethylphenyl)-2-imidazolidinylidene]dichloro(tert-butylvinylidene)(tricyclohexylphosphine)ruthenium(II) (C841).

Still further catalysts useful in ring-opening metathesis polymerization (ROMP) reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

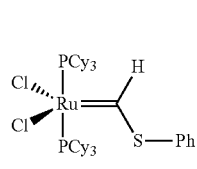
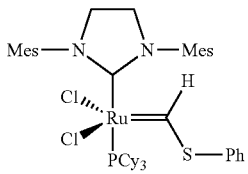

-continued

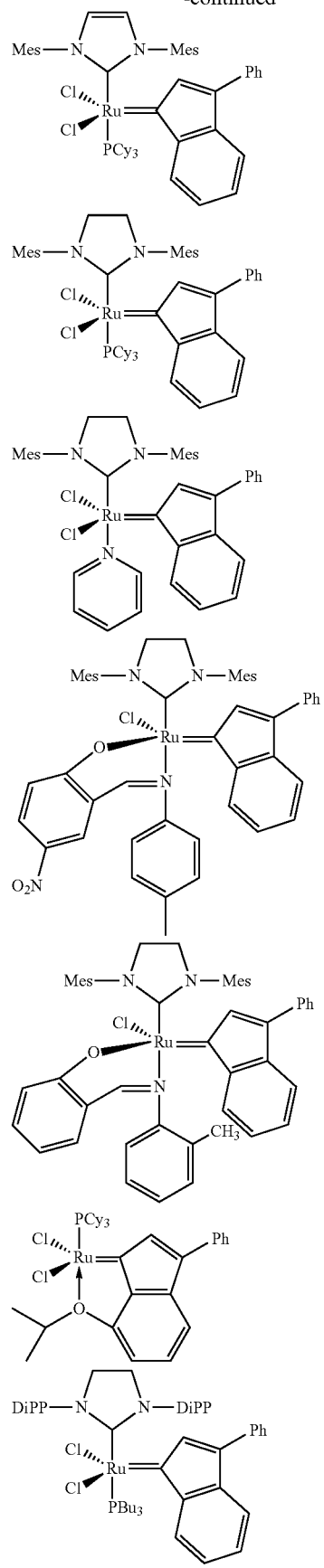

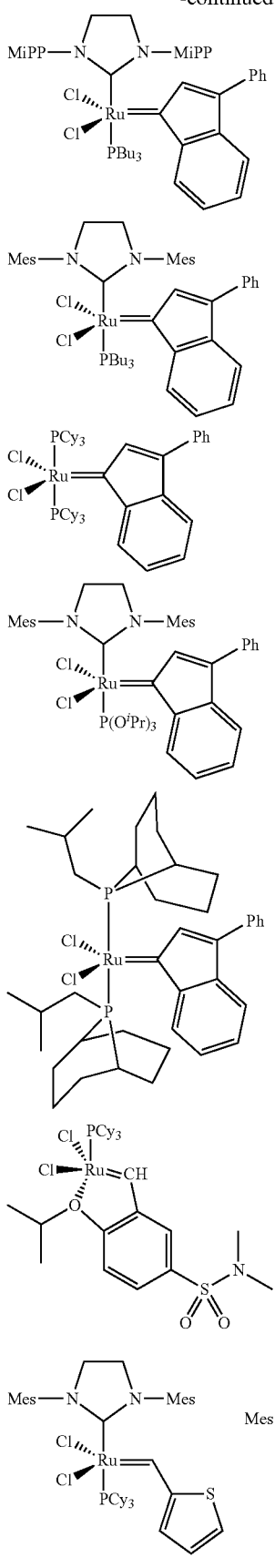

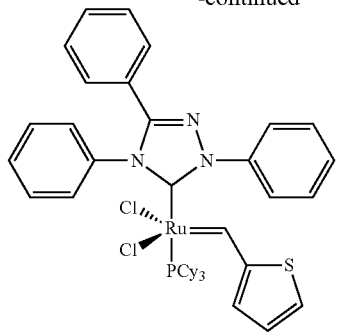

In general, the transition metal complexes used as catalysts herein can be prepared by several different methods, such as those described by Schwab et al. (1996) *J Am. Chem. Soc.* 118:100-110, Scholl et al. (1999) *Org. Lett.* 6:953-956, Sanford et al. (2001) *J Am. Chem. Soc.* 123:749-750, U.S. Pat. Nos. 5,312,940, and 5,342,909. Also see U.S. Pat. Pub. App. No. 2003/0055262 to Grubbs et al. filed Apr. 16, 2002 for "Group 8 Transition Metal Carbene Complexes as Enantioselective Olefin Metathesis Catalysts," International Pat. Pub. No. WO 02/079208, and U.S. Pat. No. 6,613,910 to Grubbs, Morgan, Benitez, and Louie, for "One-Pot Synthesis of Group 8 Transition Metal Carbene Complexes Useful as Olefin Metathesis Catalysts," commonly assigned herewith to the California Institute of Technology. Preferred synthetic methods are described in International Pat. Pub. No. WO 03/11455A1 to Grubbs et al. for "Hexacoordinated Ruthenium or Osmium Metal Carbene Metathesis Catalysts," published Feb. 13, 2003.

Examples of olefin metathesis catalysts are Group 8 transition metal complexes having the structure of formula (I) commonly called "First Generation Grubbs" catalysts, formula (III) commonly called "Second Generation Grubbs" catalysts, or formula (VII) commonly called "Grubbs-Hoveyda" catalysts.

Examples of olefin metathesis catalysts have the structure of formula (I)

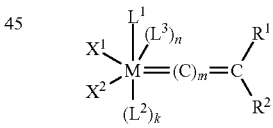

(I)

in which:
M is a Group 8 transition metal;
$L^1$, $L^2$, and $L^3$ are neutral electron donor ligands;
n is 0 or 1;
m is 0, 1, or 2;
k is 0 or 1;
$X^1$ and $X^2$ are anionic ligands;
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support;

Examples of olefin metathesis catalysts having the structure of formula (VII):

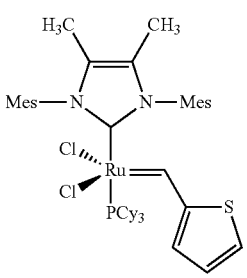

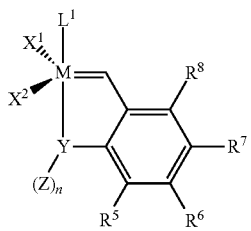

(VII)

wherein,
M is a Group 8 transition metal;
L¹ is a neutral electron donor ligand;
X¹ and X² are anionic ligands;
Y is a heteroatom selected from 0 or N;
$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;
n is 0, 1, or 2; and
Z is selected from hydrogen, hydrocarbyl, substituted hydrocarbyl, heteroatom-containing hydrocarbyl, substituted heteroatom-containing hydrocarbyl, and functional groups, wherein any combination of Y, Z, $R^5$, $R^6$, $R^7$, and $R^8$ can be linked to form one or more cyclic groups, and further wherein any combination of $X^1$, $X^2$, $L^1$, Y, Z, $R^5$, $R^6$, $R^7$, and $R^8$ may be attached to a support.

Examples of olefin metathesis catalysts having the structure of formula (I)

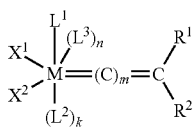

(I)

in which:
M is ruthenium;
n is 0;
m is 0;
k is 1;
$L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl) imidazol-2-ylidene and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
$X^1$ and $X^2$ are chloride;

$R^1$ is hydrogen and $R^2$ is phenyl or —CH=C(CH₃)₂ or thienyl; or $R^1$ and $R^2$ are taken together to form an indenylidene moiety.

An example of olefin metathesis catalysts have the structure of formula (VII)

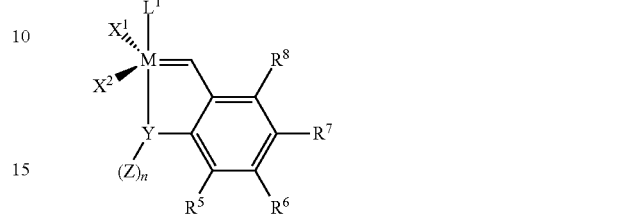

(VII)

wherein,
M is ruthenium;
$L^1$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

An example of olefin metathesis catalysts having the structure of formula (I)

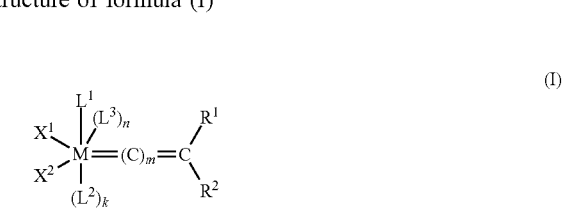

(I)

in which:
M is ruthenium;
n is 0;
m is 0;
k is 1;
$L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

$X^1$ and $X^2$ are chloride; and $R^1$ is hydrogen and $R^2$ is phenyl or —CH=C(CH₃)₂ or thienyl; or $R^1$ and $R^2$ are taken together to form an indenylidene moiety, where the indenylidene moiety is phenylindenylidene.

An example of olefin metathesis catalysts having the structure of formula (I)

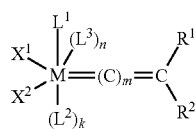

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

$X^1$ and $X^2$ are chloride; and $R^1$ is hydrogen and $R^2$ is phenyl or —CH=C(CH₃)₂; or $R^1$ and $R^2$ are taken together to form an indenylidene moiety.

An example of olefin metathesis catalysts having the structure of formula (I)

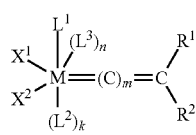

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

$X^1$ and $X^2$ are chloride; and $R^1$ is hydrogen and $R^2$ is phenyl or —CH=C(CH₃)₂; or $R^1$ and $R^2$ are taken together to form an indenylidene moiety.

An example of olefin metathesis catalysts having the structure of formula (I)

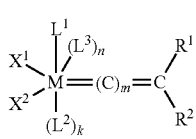

(I)

in which:

M is ruthenium;

n is 0;

m is 0;

k is 1;

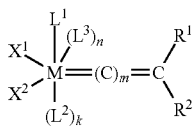

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form an indenylidene moiety, where the indenylidene moiety is phenylindenylidene.

An example of olefin metathesis catalysts having the structure of formula (I)

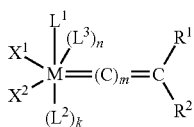

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form an indenylidene moiety.

An example of olefin metathesis catalysts having the structure of formula (I)

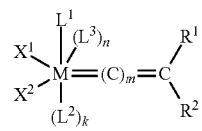

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂; or R¹ and R² are taken together to form an indenylidene moiety, where the indenylidene moiety is phenylindenylidene.

An example of olefin metathesis catalysts having the structure of formula (I)

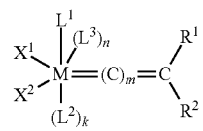

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

X¹ and X² are chloride; and

R¹ is hydrogen and R² is phenyl or —CH═C(CH₃)₂ or thienyl; or R¹ and R² are taken together to form an indenylidene moiety.

An example of olefin metathesis catalysts having the structure of formula (I)

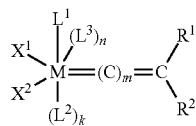

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

X¹ and X² are chloride; and

R¹ is hydrogen and R² is phenyl or —CH═C(CH₃)₂ or thienyl; or R¹ and R² are taken together to form an indenylidene moiety, where the indenylidene moiety is phenylindenylidene.

An example of olefin metathesis catalysts having the structure of formula (I)

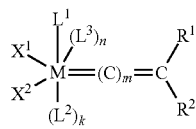

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

X¹ and X² are chloride; and

R¹ is hydrogen and R² is phenyl or —CH═C(CH₃)₂ or thienyl; or R¹ and R² are taken together to form an indenylidene moiety.

An example of olefin metathesis catalysts having the structure of formula (I)

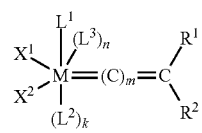

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

X¹ and X² are chloride; and

R¹ is hydrogen and R² is phenyl or —CH═C(CH₃)₂ or thienyl; or R¹ and R² are taken together to form an indenylidene moiety, where the indenylidene moiety is phenylindenylidene.

An example of olefin metathesis catalysts having the structure of formula (I)

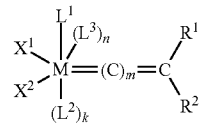

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH=C(CH₃)₂ or thienyl.

An example of olefin metathesis catalysts having the structure of formula (I)

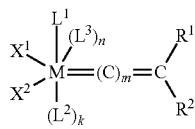

(I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH=C(CH₃)₂ or thienyl.

An example of olefin metathesis catalysts having the structure of formula (I)

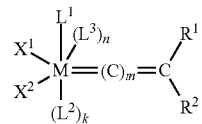

(I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH=C(CH₃)₂ or thienyl.

An example of olefin metathesis catalysts having the structure of formula (I)

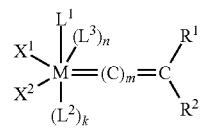

(I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH=C(CH₃)₂ or thienyl.

An example of olefin metathesis catalysts having the structure of formula (I)

$$X^1 \diagdown \underset{(L^2)_k}{\overset{L^1}{\underset{|}{M}}} \underset{(L^3)_n}{=} (C)_m = C \diagup \overset{R^1}{\underset{R^2}{}}$$ (I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-diisopropylphenyl)imidazol-2-ylidene and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂.

An example of olefin metathesis catalysts having the structure of formula (I)

$$X^1 \diagdown \underset{(L^2)_k}{\overset{L^1}{\underset{|}{M}}} \underset{(L^3)_n}{=} (C)_m = C \diagup \overset{R^1}{\underset{R^2}{}}$$ (I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂.

An example of olefin metathesis catalysts having the structure of formula (I)

$$X^1 \diagdown \underset{(L^2)_k}{\overset{L^1}{\underset{|}{M}}} \underset{(L^3)_n}{=} (C)_m = C \diagup \overset{R^1}{\underset{R^2}{}}$$ (I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);
X¹ and X² are chloride; and
R¹ is hydrogen and R² is phenyl or —CH═C(CH₃)₂.

An example of olefin metathesis catalysts having the structure of formula (I)

$$X^1 \diagdown \underset{(L^2)_k}{\overset{L^1}{\underset{|}{M}}} \underset{(L^3)_n}{=} (C)_m = C \diagup \overset{R^1}{\underset{R^2}{}}$$ (I)

in which:
M is ruthenium;
n is 0;
m is 0;
k is 1;
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph);

$X^1$ and $X^2$ are chloride; and $R^1$ is hydrogen and $R^2$ is phenyl or —CH=C(CH₃)₂.

An example of olefin metathesis catalysts having the structure of formula (XV):

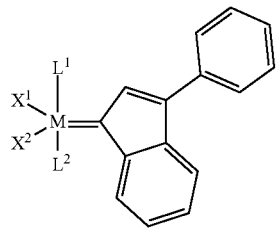

(XV)

wherein,

M is ruthenium;

$X^1$ and $X^2$ are chloride; and $L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

An example of olefin metathesis catalysts having the structure of formula (XV):

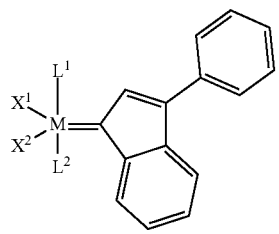

(XV)

wherein,

M is ruthenium;

$X^1$ and $X^2$ are chloride; and $L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

An example of olefin metathesis catalysts having the structure of formula (XV):

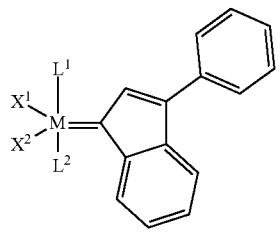

(XV)

wherein,

M is ruthenium;

$X^1$ and $X^2$ are chloride; and $L^1$ and $L^2$ are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

An example of olefin metathesis catalysts having the structure of formula (XV):

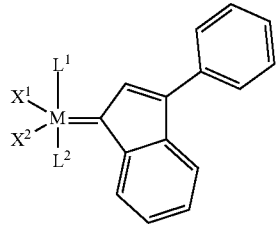

(XV)

wherein,

M is ruthenium;

$X^1$ and $X^2$ are chloride; and

L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The metathesis catalysts that are described infra may be utilized in olefin metathesis reactions according to techniques known in the art. The catalyst is typically added to the reaction medium as a solid, or as a suspension wherein the catalyst is suspended in an appropriate liquid. When the metathesis catalyst is added to the reaction medium (e.g., resin composition) as a suspension, the at least one olefin metathesis catalyst is suspended in a dispersing carrier such as mineral oil, paraffin oil, soybean oil, tri-isopropylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. The metathesis catalyst may be added to a reaction medium (e.g., resin composition) as a solution, for example, dissolved in a suitable solvent such as for example methylene chloride or toluene. It will be appreciated that the amount of catalyst that is used (i.e., the "catalyst loading") in the reaction is dependent upon a variety of factors such as the identity of the reactants and the reaction conditions that are employed.

It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst loading will generally be present in an amount that ranges from a low of about 10,000,000:1, 1,000,000:1, 200,00:1, to a high of about 100,000:1 66,667:1, 40,000:1, 20,000:1, 10,000:1, 5,000:1 or 1,000:1.

Cyclic Olefin (Resin) Compositions and Articles

Cyclic olefin resin, particularly ROMP, compositions according to the invention generally comprise one or more cyclic olefins, a cyclic olefin metathesis catalyst, a functionalized silane and a peroxide. The cyclic olefins described hereinabove are suitable for use and may be functionalized or unfunctionalized, and may be substituted or unsubstituted. In general, particularly advantageous results may be obtained for ROMP resin compositions wherein the functionalized silane and the peroxide are present in an amount effective to increase the adhesion of the ROMP composition to a substrate material when the ROMP composition is subjected to metathesis catalysis conditions in the presence of a substrate material.

As described herein, the functionalized silane and peroxide together form the adhesion promoter of the invention. The amounts of the functionalized silane and the peroxide in the resin composition may vary over a wide range and are generally independent of each other. The relative amounts of each may also vary depending on the manufacturing operation or the particular end-use application. Generally, any level of functionalized silane and any level of peroxide that together produce a desired increase in mechanical properties is of particular interest. When formulated or combined with a resin composition, the concentration of each of the functionalized silane and peroxide typically range from 0.1-10 phr, more particularly between 0.25-2 phr. The concentrations of functionalized silane and peroxide need not be the same to achieve advantageous mechanical properties. In a preferred aspect of the invention, increased mechanical properties may be obtained for resin compositions comprising the adhesion promoter as compared to resin compositions that merely include a silane and/or a peroxide compound rather than the adhesion promoter of the invention. For example, the combination of the silane and the peroxide of the adhesion promoter may provide a synergistic improvement in mechanical properties, such as interlaminar shear strength (ILSS), of as much as about 20% compared to the use of the silane or the peroxide alone. Preferably, the combination of the silane and the peroxide of the adhesion promoter provides at least a 2% improvement in an adhesion property (e.g., ILSS), more particularly at least a 5%, or 10%, or 15%, or 20% improvement in the adhesion property compared to the use of the silane alone.

Resin compositions of the invention may be optionally formulated with additives. Suitable additives include, but are not limited to, gel modifiers, hardness modulators, antioxidants, stabilizers, fillers, binders, plasticizers, pigments, flame retardants, dyes, fibers and reinforcement materials, including sized reinforcements and substrates, such as those treated with finishes, coatings, coupling agents, film formers and/or lubricants.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon trade name).

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The amount of microparticulate density modulators (e.g. glass, metal, thermoplastic (either expandable or pre-expanded) or thermoset, and/or ceramic/silicate microspheres) which may be included in the resin compositions of the invention is about 1% to about 99% by volume, preferably about 20% to about 90% by volume, more preferably about 30% to about 80% by volume. Using the volume percentage, one skilled in the art can determine the appropriate weight fraction to use based on the known densities of the resin and the microparticulate density modulator used.

In some instances microparticulate density modulators (e.g. glass, metal, thermoplastic (either expandable or pre-expanded) or thermoset, and/or ceramic/silicate microspheres) may be surface treated or surface coated. This may improve the interaction between the polymer matrix and the microparticulate density modulators. It may improve adhesion between the polymer matrix and the microparticulate density modulators. It may increase the strength and/or resilience and/or toughness of the composite. In other instances the microparticulate density modulators are not surface treated or surface coated.

There may be more than one type of microparticulate density modulators (e.g. glass, metal, thermoplastic (either expandable or pre-expanded) or thermoset, and/or ceramic/ silicate microspheres) used in the resin compositions of the invention. For example, many different types of microspheres may be used in the resin compositions of the invention to form suitable syntactic foams. More than one grade of microparticulate density modulators may be used in the resin compositions of the invention. For example, microspheres having a range of crush strengths, densities, and particle sizes may be used in the resin compositions of the invention to form suitable syntactic foams. Microparticulate density modulators may be used in combination with other suitable fillers and/or additives in resin compositions of the invention. Resin compositions of the invention may comprise more than one type of microparticulate density modulator. Resin compositions of the invention may comprise more than one grade of microparticulate density modulators.

Examples of suitable glass microspheres include, but are not limited to, 3M™ Glass Bubbles of the following grades: K1, K15, S15, S22, K20, K25, S32, S35, K37, XLD3000, S38, S38HS, S38XHS, XLD6000, K46, K42HS, S60, S60HS, iM30K, A16/500, G18, A20/1000, H20/1000, D32/4500, H50/10000 EPX, S42XHS, S80HP, S80HS; iM16K; Sinosteel Maanshan Institute of Mining Research Co., Ltd. glass microspheres such as H Series hollow glass microspheres, Y Series hollow glass microspheres, T Series hollow glass microspheres (T20, T25, T40, T32, T46, T60); Trelleborg Eccospheres® of the following grades: FTD-200, FTD-250, SI-100, SI-130, SI-160, SI-200, SI-250, SID-160Z, SID-200Z, SID-230Z, SID-270Z, SID-311Z, SID-350Z; Cospheric, LLC glass microspheres of the following types: hollow glass microspheres (Product ID: HGMS-0.14; HGMS-0.6; HGMS-0.46).

Additional examples of suitable glass microspheres include, but are not limited to, Cospheric, LLC glass microspheres of the following types: solid soda lime glass microspheres (Product ID: SLGMS-2.52), solid soda lime glass spheres (Product ID: SLGS-2.52), solid soda lime glass microspheres (Product ID: S-SLGMS-2.2), solid soda lime glass microspheres (Product ID: P2000SL-2.52), barium titanate solid glass microspheres (Product ID: BTGMS-4.49-B), barium titanate solid glass microspheres (Product ID: BTGMS-4.49), blue fluorescent-coated glass microspheres (Product ID: HCMS-FMB), borosilicate solid glass microspheres (Product ID: BSGMS-2,2), conductive gold-coated solid barium titanate glass microspheres (Product ID: BTGMS-AU-4.49), conductive nickel metal coated hollow glass microspheres (Product ID: M-18-Ni-0.69), conductive nickel-plated hollow glass microspheres (Product ID: HGMS-Ni), conductive silver metal coated hollow glass microspheres (Product ID: M-60-0.16), conductive silver metal coated hollow glass microspheres (Product ID: M-40-0.49), conductive silver metal coated hollow glass microspheres (Product ID: M-18-AG-0.72), conductive silver metal coated hollow glass microspheres (Product ID: HGMS-AG-1.08), conductive silver metal coated soda lime solid glass microspheres (Product ID: SLGMS-AG-2.5-B), conductive silver metal coated soda lime solid glass microspheres (Product ID: SLGMS-AG-2.5), green fluorescent-coated glass microspheres (Product ID: HCMS-FMG), orange fluorescent-coated glass microspheres (Product ID: HCMS-FMO), red fluorescent-coated glass microspheres (Product ID: HCMS-FMR), retroreflective aluminum coated solid glass microspheres (Product ID: P2453BTA-4.49), solid E glass spheres (Product ID: EGS-2.54, titanium dioxide ($TiO_2$) coated hollow glass microspheres (Product ID: TiO2-coated), yellow fluorescent-coated glass microspheres (Product ID: HCMS-FMY), zinc oxide (ZnO) coated hollow glass microspheres (Product ID: HGMS-ZnO-0.66).

Examples of suitable ceramic microspheres include, but are not limited to, 3M™ Ceramic Microspheres of the following grades: W-210, W-410, W-610; 3M™ Z-Light Spheres™ Ceramic Microspheres of the following grades: G-3125, G-3150, G-3500; 3M™ Zeeospheres™ Ceramic Microspheres of the following grades: G-200, G-400, G-600, G-800, G-850, W-210, W-410, W-610.

The invention is also directed to articles manufactured from a resin composition comprising a cyclic olefin, an olefin metathesis catalyst, such as a ROMP catalyst, and the adhesion promoter. Articles may include, but are not limited to, those formed by standard manufacturing techniques including casting, centrifugal casting, pultrusion, molding, rotational molding, open molding, reaction injection molding (RIM), resin transfer molding (RTM), pouring, vacuum impregnation, surface coating, filament winding and other methods known to be useful for production of polymer articles. Molded parts include but are not limited to reaction injection molding, resin transfer molding & vacuum assisted resin transfer molding. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials. Syntactic foams prepared according to the invention may be suitable for preparing articles of manufacture for use as buoyancy materials and thermal insulation materials (e.g., subsea thermal insulation materials).

Resin compositions according to the invention may additionally comprise an exogenous inhibitor. Exogenous inhibitors or "gel modification additives", for use in the present invention are disclosed in U.S. Pat. No. 5,939,504, the contents of which are also incorporated herein by reference. Non-limiting examples of exogenous inhibitors or "gel modification additives" include water, tetrahydrofuran (THF), 2-methyltetrahydrofuran (2-Me-THF), diethyl ether ($(C_2H_5)_2O$), methyl-tert-butyl ether ($CH_3OC(CH_3)_3$), dimethoxyethane ($CH_3OCH_2CH_2OCH_3$), diglyme ($CH_3OCH_2OCH_2OCH_3$), trimethylphosphine ($PMe_3$), triethylphosphine ($PEt_3$), tributylphosphine (PBu3), tri(ortho-tolyl)phosphine ($P-o-tolyl_3$), tri-tert-butylphosphine ($P-tert-Bu_3$), tricyclopentylphosphine ($PCyclopentyl_3$), tricyclohexylphosphine ($PCy_3$), triisopropylphosphine ($P-i-Pr_3$), trioctylphosphine ($POct_3$), triisobutylphosphine ($P-i-Bu_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), diethylphenylphosphine ($PEt_2Ph$), trimethylphosphite ($P(OMe)_3$), triethylphosphite, ($P(OEt)_3$), triisopropylphosphite ($P(O-i-Pr)_3$), ethyl diphenylphosphinite ($P(OEt)Ph_2$), tributylphosphite ($P(OBu)_3$), triphenylphosphite ($P(OPh)_3$), diethylphenylphosphonite ($P(OEt)_2Ph$), and tribenzylphosphine ($P(CH_2Ph)_3$), 2-cyclohexenone, and triphenylphosphine oxide. Preferred exogenous inhibitors include triphenylphosphine, tricyclohexylphosphine, and tributylphosphine. The most preferred exogenous inhibitor is triphenylphosphine. When formulated or combined with a resin composition, the concentration of the exogenous inhibitor typically ranges from 0.001-10 phr, particularly 0.01-5 phr, more particularly 0.05-3 phr. Exogenous inhibitors may be added to the resin composition in the absence of solvent, or as organic solutions. A single exogenous inhibitor may be used, or a combination of two or more different exogenous inhibitors may be used.

Resin compositions according to the invention may additionally comprise a hydroperoxide gel modifier. Hydroperoxide gel modifiers for use in the present invention are disclosed in International Pat. App. No. PCT/US2012/042850, the contents of which are also incorporated herein by reference. Non-limiting examples of hydroperoxide gel modifiers include tert-butyl hydroperoxide, tert-amyl hydroperoxide, cumene hydroperoxide, diisopropyl benzene hydroperoxide, (2,5-dihydroperoxy)-2,5-dimethylhexane, cyclohexyl hydroperoxide, triphenylmethyl hydroperoxide, pinane hydroperoxide (e.g., Glidox® 500; LyondellBasell), and paramenthane hydroperoxide (e.g., Glidox® 300; LyondellBasell). More preferably, the hydroperoxides suitable for use include tert-butyl hydroperoxide and cumene hydroperoxide. Hydroperoxide gel-modification additives may be added to the reaction mixture in the absence of solvent, or as organic or aqueous solutions. A single hydroperoxide compound may be used as the gel-modification additive, or a combination of two or more different hydroperoxide compounds may be used. All concentrations of hydroperoxide which delay the onset of the gel-state of a particular metathesis polymerization. Advantageously, the use of hydroperoxides gel modifiers has been found to substantially maintain the properties of the cured polymer including peak exotherm temperature and mechanical properties. While not necessarily limited, the hydroperoxide concentration is advantageously between 0.01 and 1000 equivalents with respect to catalyst. In other embodiments the hydroperoxide concentration may be between 0.1 and 20 equivalents with respect to catalyst. Generally, higher concentrations of hydroperoxide will lead to longer pot life. Additionally, in other embodiments the hydroperoxide concentration may be between 0.05 and 100 equivalents with respect to catalyst. Additionally, in other embodiments the hydroperoxide concentration may be between 0.1 and 50 equivalents with respect to catalyst.

Resin compositions of the invention may additionally comprise at least one 5-alkenyl-2-norbornene as a pot life adjusting agent. 5-alkenyl-2-norbornenes for use in the present invention are disclosed in U.S. Pat. No. 5,204,427 and non-limiting examples include 5-vinylbicyclo[2.2.1]hepto-2-ene (5-vinyl-2-norbornene); 5-isopropenylbicyclo[2.2.1]hepto-2-ene (5-isopropenyl-2-norbornene); 5-vinyl-4-vinylbicyclo[2.2.1]hepto-2-ene (5-vinyl-4-vinyl-2-norbornene); 5-propenyl-bicyclo[2.2.1]hepto-2-ene (5-propenyl-2-norbornene); 5-butenyl-bicyclo[2.2.1]hepto-2-ene (5-butenyl-2-norbornene; 5-pentenyl-bicyclo[2.2.1]hepto-2-ene (5-pentenyl-2-norbornene); and their monomethyl, monochloro, and dichloro substituents, including the endo and exo isomers, and mixtures thereof. More preferred 5-alkenyl-2-norbornene(s) include 5-vinyl-2-norbornene, 5-isopropenyl-2-noborbornene, 5-propenyl-2-norbornene, and 5-butenyl-2-norbornene, including the endo and exo isomers, and mixtures thereof. The most preferred 5-alkenyl-2-norborne pot life adjusting agent is 5-vinyl-2-norbornene, including the endo and exo isomers, and mixtures thereof 5-alkenyl-2-norbornene pot life adjusting agents are normally employed in the resin composition at levels of about 0.01 phr to 10 phr, more preferably at levels of about 0.1 phr to 5 phr, even more preferably at levels of about 0.1 phr to 3 phr. 5-alkenyl-2-norborne pot life adjusting agents may be added to the resin composition in the absence of solvent, or as organic solutions. A single 5-alkenyl-2-norborne pot life adjusting agent may be used as a pot life adjusting agent, or a combination of two or more different 5-alkenyl-2-norbornene pot life adjusting agents may be used.

Resin compositions according to the invention may further comprise a sizing composition, or be used to provide improved adhesion to substrate materials that are sized with certain commercial silanes commonly used in the industry. As is known in the art, glass fibers are typically treated with a chemical solution (e.g., a sizing composition) soon after their formation to reinforce the glass fibers and protect the strands' mechanical integrity during processing and composite manufacture. Sizing treatments compatible with olefin metathesis catalysts and polydicyclopentadiene composites have been described in U.S. Pat. Nos. 6,890,650 and 6,436,476. However, these disclosures are based on the use of specialty silane treatments that are not commonly used in industrial glass manufacture. By comparison, the current invention may provide improved mechanical properties for polymer-glass composites that are sized with silanes commonly used in the industry.

Glass sizing formulations typically comprise at least one film former (typically a film forming polymer), at least one silane, and at least one lubricant. Any components of a sizing formulation that do not interfere with or substantially decrease the effectiveness of the metathesis catalyst or olefin polymerization reaction are considered to be compatible with the current invention and may generally be used herein.

Film formers that are compatible with ROMP catalysts include epoxies, polyesters, polyurethanes, polyolefins, and/or polyvinyl acetates. Other common film formers that do not adversely affect the performance of the olefin metathesis catalyst may also be used. Film formers are typically used as nonionic, aqueous emulsions. More than one film former may be used in a given sizing formulation, to achieve a desired balance of glass processability and composite mechanical properties.

More particularly, the film former may comprise a low molecular weight epoxy emulsion, defined as an epoxy monomer or oligomer with an average molecular weight per epoxide group (EEW) of less than 500, and/or a high molecular weight epoxy emulsion, defined as an epoxy monomer or oligomer with an average molecular weight per epoxide group (EEW) of greater than 500. Examples of suitable low molecular weight products include aqueous epoxy emulsions produced by Franklin International, including Franklin K8-0203 (EEW 190) and Franklin E-102 (EEW 225-275). Other examples of low molecular weight epoxy emulsions are available from Hexion, including EPI-REZ 3510-W-60 (EEW 185-215), and EPI-REZ 3515-W-60 (EEW 225-275). Further examples of low molecular weight epoxy emulsions are available from COIM, including Filco 309 (EEW 270) and Filco 306 (EEW 330). Further examples of low molecular weight epoxy emulsions are available from DSM, including Neoxil 965 (EEW 220-280) and Neoxil 4555 (EEW 220-260). Examples of suitable high molecular weight epoxy emulsion products include epoxy emulsions produced by Hexion, including EPI-REZ 3522-W-60 (EEW 615-715).

Aqueous emulsions of modified epoxies, polyesters, and polyurethanes may also be used in the film former. Examples of suitable modified epoxy products include emulsions produced by DSM, including Neoxil 2626 (a plasticized epoxy with an EEW of 500-620), Neoxil 962/D (an epoxy-ester with an EEW of 470-550), Neoxil 3613 (an epoxy-ester with an EEW of 500-800), Neoxil 5716 (an epoxy-novolac with an EEW of 210-290), Neoxil 0035 (a plasticized epoxy-ester with an EEW of 2500), and Neoxil 729 (a lubricated epoxy with an EEW of 200-800). Further examples of modified epoxy emulsions are available from COIM, including Filco 339 (an unsaturated polyester-epoxy with an EEW of 2000) and Filco 362 (an epoxy-ester with an EEW of 530). Examples of suitable polyester products include emulsions produced by DSM, including Neoxil 954/D, Neoxil 2635, and Neoxil 4759 (unsaturated bisphenolic polyesters). Additional suitable products from DSM include Neoxil 9166 and Neoxil 968/60 (adipate polyesters). Further examples of suitable products include emulsions produced by COIM, including Filco 354/N (unsaturated bisphenolic polyester), Filco 350 (unsaturated polyester), and Filco 368 (saturated polyester). Examples of suitable polyurethane products include emulsions produced by Bayer Material Science, including Baybond 330 and Baybond 401.

The film former may also comprise polyolefins or polyolefin-acrylic copolymers, polyvinylacetates, modified polyvinylacetates, or polyolefin-acetate copolymers. Suitable polyolefins include, but are not limited to, polyethylenes, polypropylenes, polybutylenes, and copolymers thereof, and the polyolefins may be oxidized, maleated, or otherwise treated for effective film former use. Examples of suitable products include emulsions produced by Michelman, including Michem Emulsion 91735, Michem Emulsion 35160, Michem Emulsion 42540, Michem Emulsion 69230, Michem Emulsion 34040M1, Michem Prime 4983R, and Michem Prime 4982SC. Examples of suitable products include emulsions produced by HB Fuller, including PD 708H, PD 707, and PD 0166. Additional suitable products include emulsions produced by Franklin International, including Duracet 637. Additional suitable products include emulsions produced by Celanese, including Vinamul 8823 (plasticized polyvinylacetate), Dur-O-Set E-200 (ethylene-vinyl acetate copolymer), Dur-O-Set TX840 (ethylene-vinyl acetate copolymer), and Resyn 1971 (epoxy-modified polyvinylacetate).

While not limited thereto, preferred film formers include low- and high-molecular weight epoxies, saturated and unsaturated polyesters, and polyolefins, such as Franklin K80-203, Franklin E-102, Hexion 3510-W-60, Hexion 3515-W-60, and Michelman 35160.

Nonionic lubricants may also be added to the sizing composition. Suitable nonionic lubricants that are compatible with ROMP compositions include esters of polyethylene glycols and block copolymers of ethylene oxide and propylene oxide. More than one nonionic lubricant may be used in a given sizing formulation if desired, e.g., to achieve a desired balance of glass processability and composite mechanical properties.

Suitable lubricants may contain polyethylene glycol (PEG) units with an average molecular weight between 200 and 2000, preferably between 200-600. These PEG units can be esterified with one or more fatty acids, including oleate, tallate, laurate, stearate, and others. Particularly preferred lubricants include PEG 400 dilaurate, PEG 600 dilaurate, PEG 400 distearate, PEG 600 distearate, PEG 400 dioleate, and PEG 600 dioleate. Examples of suitable products include compounds produced by BASF, including MAPEG 400 DO, MAPEG 400 DOT, MAPEG 600 DO, MAPEG 600 DOT, and MAPEG 600 DS. Additional suitable products include compounds produced by Zschimmer & Schwarz, including Mulsifan 200 DO, Mulsifan 400 DO, Mulsifan 600 DO, Mulsifan 200 DL, Mulsifan 400 DL, Mulsifan 600 DL, Mulsifan 200 DS, Mulsifan 400 DS, and Mulsifan 600 DS. Additional suitable products include compounds produced by Cognis, including Agnique PEG 300 DO, Agnique PEG 400 DO, and Agnique PEG 600 DO.

Suitable nonionic lubricants also include block copolymers of ethylene oxide and propylene oxide. Examples of suitable products include compounds produced by BASF, including Pluronic $L^{62}$, Pluronic $L^{101}$, Pluronic P103, and Pluronic P105.

Cationic lubricants may also be added to the sizing composition. Cationic lubricants that are compatible with ROMP include modified polyethyleneimines, such as Emery 6760L produced by Pulcra Chemicals.

Silane coupling agent may optionally be added to the sizing composition, non-limiting examples including, methacrylate, acrylate, amino or epoxy functionalized silanes along with alkyl, alkenyl and norbornenyl silanes.

Optionally, the sizing composition may contain one or more additives for modifying the pH of the sizing resin. One preferred pH modifier is acetic acid.

The sizing composition may optionally contain other additives useful in glass sizing compositions. Such additives may include emulsifiers, defoamers, cosolvents, biocides, antioxidants, and additives designed to improve the effectiveness of the sizing composition. The sizing composition can be prepared by any method and applied to substrate materials for use herein, such as glass fibers or fabric, by any technique or method.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

Experimental

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric.

EXAMPLES

Materials and Methods

All reactions were performed under ambient conditions unless otherwise noted. All solvents and reagents were purchased from commercial suppliers and used as received unless otherwise noted.

Ultrene® 99 dicyclopentadiene (DCPD) was obtained from Cymetech Corporation. A modified DCPD containing 20-25% tricyclopentadiene (and small amounts of higher cyclopentadiene homologs) was then prepared by the heat cracking of the Ultrene® 99 as generally described in U.S. Pat. No. 4,899,005. A DCPD base resin containing 5% tricyclopentadiene was blended from DCPD containing 20-25% tricyclopentadiene with Ultrene® 99. Tricyclopentadiene (TCPD) was prepared as generally described in European Pat. No. EP0271007B2 and purified to greater than 95% by vacuum distillation. A DCPD resin containing 72% tricyclopentadiene was prepared by blending DCPD containing 20-25% tricyclopentadiene with TCPD.

Ethanox® 4702 (Albemarle Corporation) antioxidant (4,4'methylenebis (2,6-di-tertiary-butylphenol)) was used where indicated. Cumene hydroperoxide (CHP) was used as received from Sigma Aldrich (88% purity) or Syrgis Performance Initiators (Norox® CHP, 85%). CHP was added to resin formulations as a 1,000 ppm concentration stock solution in DCPD. γ-Methacryloxypropyl-trimethoxy silane (A174) (Sigma Aldrich, 98%) and di-tert-butyl peroxide (Sigma Aldrich, 98%) were used as provided. CAB-O-SIL® TS-610 fumed silica (Cabot Corporation) and K11 and K25 glass microspheres (3M Company) were used as provided. Heat-cleaned woven E glass fabric (7781-F12, eight harness satin, 8.81 ounces per square yard) was obtained from Hexcel Corporation. Triphenylphosphine (TPP) was used as received from Arkema. 5-Vinyl-2-norbornene (>99%) was used as received from JX Nippon Chemical Texas Inc. $K_{20}$ glass microspheres (3M Company) were used as provided.

Olefin metathesis catalysts were prepared by standard methods and include [1,3-bis-(2,4,6-trimethylphenyl)-2-imidazolidinylidene]dichloro(3-methyl-2-butenylidene) (tricyclohexylphosphine) ruthenium(II) (C827); 1,3-bis-(2,4,6-trimethylphenyl)-2-imidazolidinylidene] dichloro(benzylidene) (tricyclohexylphosphine)ruthenium(II) (C848); [1,3-bis-(2,4,6-trimethylphenyl)-2-imidazolidinylidene]dichloro(benzylidene)(tri-n-butylphosphine)ruthenium(II) (C771); ruthenium (II) dichloro (3-methyl-2-butenylidene) bis(tricyclohexylphosphine) (C801); [1,3-bis-(2,4,6-trimethylphenyl)-2-imidazolidinylidenedichloro(phenylindenylidene)(diethylphenylphosphine)ruthenium(II) (C835); [1,3-bis-(2,4,6-trimethylphenyl)-2-imidazolidinylidene]dichloro(3-methyl-2-butenylidene)(methyldiphenylphosphine)ruthenium (II) (C747); [1,3-bis-(2,4,6-trimethylphenyl)-2-imidazolidinylidene]dichloro(tert-butylvinylidene) (tricyclohexylphosphine)ruthenium(II) (C841). Catalyst Composition (A): C827 (monomer to catalyst ratio 60,000:1) and C848 (monomer to catalyst ratio 900,000:1) suspended in mineral oil (Crystal Plus 500 FG) containing 2 phr Cab-o-sil TS610.

Additives to the resin are reported as ppm which is defined as the grams of additive per million grams of resin or as PHR which is defined as the weight of the additive per hundred grams of resin.

Silane-treated glass fabric was prepared by soaking cut swatches of Hexcel 7781-F12 glass in an acidified (pH 3.5-4.0) aqueous solution of A174 (2.0 wt %) for three minutes and then drying them in a forced-air oven at 125° C. for 90 minutes.

Glass composite laminates were prepared using the vacuum assisted resin transfer molding or VARTM process. The laminate was constructed by cutting and arranging 15 plies of glass fabric on an aluminum tool. A rigid plate was placed on top of the ply stack to ensure that pressure was applied evenly across the surface. Using braided tubing, an infusion inlet and outlet vent were positioned appropriately near the glass fabric. A sheet of vacuum bagging film and tacky tape was used to create an air-tight cover on the glass and the tubing and evacuated to a vacuum level of between 25 inches-Hg to 28 inches-Hg. A mixture of resin and catalyst was degassed in vacuo for 15 minutes and then back-filled with nitrogen. The mixture was then infused in to the glass fabric, driven by the pressure gradient between the ambient pressure and the evacuated glass fabric assembly. After the infusion was complete, the composite laminate was heated from room temperature to 75° C. at a heating rate of 2° C./min, and then the composite laminate was heated to 120° C. and held at that temperature for two hours.

The mechanical properties were measured using standard techniques. All values reported are the average of 3 samples. Interlaminar shear strength (ILSS) was measured by the short-beam shear method according to ASTM D2344 on 1"×¼"×⅛" samples. Compression peak stress was tested according to ASTM D695 using 1"×½"×½" samples and normalized with density. All samples were stored and tested at ambient room conditions.

Foam Density Measurements: The weight of the sample was divided by the calculated volume of the sample. The density was reported in pounds/ft$^3$ (i.e., pounds per cubic foot—pcf)

Example 1

Glass Fabric Composite Control Sample

DCPD containing 20-25% tricyclopentadiene was formulated with 2 phr Ethanox® 4702 antioxidant and 20 ppm CHP. The resin was catalyzed by the addition of C827 (monomer to catalyst ratio 60,000:1) in a suspension of mineral oil. A glass composite laminate was fabricated via the VARTM process using heat-cleaned 7781-F12 glass fabric infused with the resin mixture. The resulting composite had poor mechanical properties (Table 1).

Example 2

Glass Fabric Composite with Silane Additive

A composite laminate was formed as described in Example 1 except that 1 PHR of A174 silane was added to the resin mixture. The resulting composite demonstrated improved mechanical properties (Table 1).

Example 3

Glass Fabric Composite with Peroxide Additive

A composite laminate was formed as described in Example 1 except that 1 PHR of di-tert-butyl peroxide was added to the resin mixture. The resulting composite demonstrated poor mechanical properties (Table 1).

Example 4

Glass Fabric Composite with Silane and Peroxide Additives

A composite laminate was formed as described in Example 1 except that 1 PHR of di-tert-butyl peroxide and 1 PHR of A174 silane were added to the resin mixture. The resulting composite demonstrated superior mechanical properties (Table 1).

TABLE 1

Mechanical Properties of Composite Glass Laminates (unsized fabric)

| Example | A174 Silane Additive | Di-tert-Butyl Peroxide Additive | Fiber Volume | ILSS (psi) | ILSS Improvement |
|---|---|---|---|---|---|
| 1 | none | none | 41.0 | 2,178 | 0% |
| 2 | 1 PHR | none | 43.8 | 5,708 | 162% |
| 3 | none | 1 PHR | 40.8 | 2,676 | 23% |
| 4 | 1 PHR | 1 PHR | 41.9 | 7,012 | 222% |

Example 5

Silane-Treated Glass Fabric Composite Control Sample

A composite laminate was formed as described in Example 1 except that the silane-treated 7781-F12 glass fabric was used. The resulting composite demonstrated poor mechanical properties (Table 2).

Example 6

Silane-Treated Glass Fabric Composite with Peroxide Additive

A composite laminate was formed as described in Example 5 except that 1 PHR of di-tert-butyl peroxide was added to the resin mixture. The resulting composite demonstrated moderately improved mechanical properties (Table 2).

Example 7

Silane-Treated Glass Fabric Composite with Silane and Peroxide Additives

A composite laminate was formed as described in Example 5 except that 1 PHR of di-tert-butyl peroxide and 1 PHR of A174 silane were added to the resin mixture. The resulting composite demonstrated moderately improved mechanical properties (Table 2).

TABLE 2

Mechanical Properties of Composite Glass Laminates (silane-treated fabric)

| Example | A174 Silane Additive | Di-tert-Butyl Peroxide Additive | Fiber Volume | ILSS (psi) | ILSS Improvement |
|---|---|---|---|---|---|
| 5 | none | none | 45.1 | 3,505 | 0% |
| 6 | none | 1 PHR | 43.2 | 4,520 | 29% |
| 7 | 1 PHR | 1 PHR | 43.2 | 6,567 | 87% |

Example 8

Glass Microsphere Syntactic Foam Control Sample

DCPD containing 5% tricyclopentadiene was filtered through activated alumina and silica gel to remove any impurities was then formulated with 3 PHR Ethanox® 4702 antioxidant, 0.5 PHR CAB-O-SIL® TS-610 fumed silica, 5 ppm CHP, and K11 glass microspheres (57% by volume). The resin was degassed in vacuo for 20 minutes at room temperature, and then catalyzed by the addition of C827 (monomer to catalyst ratio 60,000:1) in a suspension of mineral oil. The catalyzed resin mixture was then further degassed in vacuo for an additional 5 minutes and then poured into a 6"×4"×6" aluminum mold and allowed to cure at room temperature for one hour before postcure at 160° C. for two hours. The resulting syntactic foam had a measured density of 34.53 pounds per cubic foot (pcf) and exhibited moderate mechanical properties (Table 3).

Example 9

Glass Microsphere Syntactic Foam with Peroxide Additive

A syntactic foam was formed as described in Example 8 except that 1.5 PHR of di-tert-butyl peroxide was added to the resin mixture. The resulting syntactic foam had moderate mechanical properties (Table 3).

Example 10

Glass Microsphere Syntactic Foam with Silane Additive

A syntactic foam was formed as described in Example 8 except that 1.5 PHR of A174 silane was added to the resin mixture. The resulting syntactic foam had moderately improved mechanical properties (Table 3).

Example 11

Glass Microsphere Syntactic Foam with Silane and Peroxide Additives

A syntactic foam was formed as described in Example 8 except that 1.5 PHR of di-tert-butyl peroxide and 1.5 PHR of A174 silane were added to the resin mixture. The resulting syntactic foam had superior mechanical properties (Table 3).

TABLE 3

Mechanical Properties of Glass Microsphere Syntactic Foams

| Example | A174 Silane Additive | Di-tert-Butyl Peroxide Additive | Foam Density (pcf) | Compressive Peak Stress (psi/pcf) | Compression Improvement |
|---|---|---|---|---|---|
| 8 | none | none | 34.53 | 89.8 | 0% |
| 9 | none | 1.5 PHR | 34.22 | 81.8 | −9% |
| 10 | 1.5 PHR | none | 34.22 | 105 | 17% |
| 11 | 1.5 PHR | 1.5 PHR | 33.57 | 119 | 33% |

Example 12

Glass Fabric Composite with Silane Additive

A composite laminate was formed as described in Example 1 except that 2 PHR of 5-(trimethoxysilyl)-2-norbornene (TMSNB, Promerus) was added to the resin mixture. The resulting composite demonstrated improved mechanical properties (Table 4).

Example 13

Glass Fabric Composite with Silane and Peroxide Additives

A composite laminate was formed as described in Example 1 except that 1 PHR of di-tert-butyl peroxide and 2 PHR of 5-(trimethoxysilyl)-2-norbornene (TMSNB, Promerus) were added to the resin mixture. The resulting composite demonstrated superior mechanical properties (Table 4).

TABLE 4

Mechanical Properties of Composite Glass Laminates (unsized fabric)

| Example | TMSNB Additive | Di-tert-Butyl Peroxide Additive | Fiber Volume | ILSS (psi) | ILSS Improvement |
|---|---|---|---|---|---|
| 1 | none | none | 41.0 | 2,178 | 0% |
| 3 | none | 1 PHR | 40.8 | 2,676 | 23% |
| 12 | 2 PHR | none | 47.7 | 4,995 | 129% |
| 13 | 2 PHR | 1 PHR | 42.2 | 6,076 | 179% |

Examples 14-17

Glass Fabric Composite with Silane Additive

A series of composite laminates were formed as described in Example 1 except that 1 PHR of di-tert-butyl peroxide and variable levels (0.1-2.0 PHR) of A174 silane were added to the resin mixture. The resulting composites demonstrated consistently excellent mechanical properties over a range of silane:peroxide ratios (Table 5).

TABLE 5

Mechanical Properties of Composite Glass Laminates (unsized fabric)

| Example | A174 Additive | Di-tert-Butyl Peroxide Additive | Fiber Volume | ILSS (psi) |
|---|---|---|---|---|
| 14 | 2 PHR | 1 PHR | 45.2 | 6,678 |
| 15 | 1 PHR | 1 PHR | 41.5 | 6,815 |
| 16 | 0.5 PHR | 1 PHR | 42.2 | 6,807 |
| 17 | 0.1 PHR | 1 PHR | 43.3 | 6,832 |

Examples 18-21

Glass Fabric Composite with Silane Additive

A series of composite laminates were formed as described in Example 1 except that 2 PHR of A174 silane and variable levels (3.0-0.1 PHR) of di-tert-butyl peroxide were added to the resin mixture. The resulting composites demonstrated consistently excellent mechanical properties over a range of silane:peroxide ratios (Table 6). Mechanical properties decreased by 14% in Example 21 (compared to Example 18), indicating insufficient peroxide concentration to obtain optimal mechanical properties for this type of composite.

TABLE 6

Mechanical Properties of Composite Glass Laminates (unsized fabric)

| Example | A174 Additive | Di-tert-Butyl Peroxide Additive | Fiber Volume | ILSS (psi) |
|---|---|---|---|---|
| 18 | 2 PHR | 3 PHR | 43.8 | 6,850 |
| 19 | 2 PHR | 2 PHR | 43.5 | 6,506 |
| 14 | 2 PHR | 1 PHR | 45.2 | 6,678 |
| 20 | 2 PHR | 0.5 PHR | 45.4 | 6,264 |
| 21 | 2 PHR | 0.1 PHR | 42.5 | 5,919 |

Example 22

Glass Microsphere Syntactic Foam with Silane and Peroxide Additives

DCPD containing 20-25% tricyclopentadiene (11,314 grams) was formulated with 2 PHR Ethanox® 4702 antioxidant, 0.25 PHR CAB-O-SIL® TS-610 fumed silica, 0.15 PHR TPP, 0.6 PHR 5-vinyl-2-norbornene, 0.2 PHR A174 silane, 0.3 PHR di-tert-butyl peroxide, and K25 glass microspheres (3,498 grams) (56% by volume). The resin was degassed in vacuo for 50 minutes at ambient temperature (20-25° C.), and then catalyzed by the addition of Catalyst Composition (A) (236 grams). The catalyzed resin composition was then further degassed in vacuo for an additional 20 minutes at ambient temperature (20-25° C.) and then pumped into a 5 gallon bucket and allowed to polymerize and cure at ambient temperature (20-25° C.). The catalyzed resin composition had a peak exotherm temperature of approximately 196° C. and the time to peak exotherm was approximately 60 minutes after catalyzation. The resulting syntactic foam had an average measured density of 38.97 pounds per cubic foot (pcf) and an average compressive peak stress of 6.5 (ksi).

Examples 23-29

Glass Microsphere Syntactic Foam with Silane and Peroxide Additives

DCPD containing 20-25% tricyclopentadiene was formulated with 2 PHR Ethanox® 4702 antioxidant, 0.5 PHR CAB-O-SIL® TS-610 fumed silica, 1.5 PHR A174 silane, 2 PHR di-tert-butyl peroxide, K11 glass microspheres (57% by volume), and the inhibitor described in Table 7. The resin was degassed in vacuo for 20 minutes at room temperature, and then catalyzed by the addition of the catalyst listed in Table 7 (monomer to catalyst ratio between 5,000:1 and 60,000:1 as listed in Table 7) in a suspension of mineral oil. The catalyzed resin mixture was then further degassed in vacuo for an additional 5 minutes and then poured into a 6"×4"×6" aluminum mold and allowed to cure at room temperature for one hour before postcure at 160° C. for two hours. The average measured density and the average compressive peak stress of the resulting syntactic foam samples are provided in Table 7.

TABLE 7

Mechanical Properties of Glass Microsphere Syntactic Foams

| Example | Catalyst | Monomer to Catalyst Ratio | Inhibitor | Foam Density (pcf) | Compressive Peak Stress (psi/pcf) |
|---|---|---|---|---|---|
| 23 | C771 | 45,000:1 | none | 33.32 | 122.8 |
| 24 | C801 | 5,000:1 | TPP (0.1 phr) | 32.40 | 131.2 |
| 25 | C835 | 30,000:1 | none | 33.46 | 121.8 |
| 26 | C827 | 30,000:1 | CHP (20 ppm) | 32.79 | 122.1 |
| 27 | C747 | 60,000:1 | TPP (0.4 phr) | 32.95 | 126.8 |
| 28 | C827 | 60,000:1 | CHP (5 ppm) | 32.59 | 123.7 |
| 29 | C841* | 45,000:1 | TPP (1 phr) | 32.08 | 122.5 |

*Catalyst was dissolved in $CH_2Cl_2$ and added as a solution and the resin was not degassed after catalyst addition.

Example 30

Glass Microsphere Syntactic Foam with Silane and Peroxide Additives

A DCPD resin containing 72% tricyclopentadiene was formulated with 3 PHR BHT antioxidant, 0.5 PHR CAB-O-SIL® TS-610 fumed silica, 0.15 PHR TPP, 0.6 PHR 5-vinyl-2-norbornene, 0.5 PHR A174 silane, 0.5 PHR di-tert-butyl peroxide, and $K_{20}$ glass microspheres (57% by volume). The resin was degassed in vacuo for 40 minutes at ambient temperature (20-25° C.), and then catalyzed by the addition of Catalyst Composition (A) (236 grams). The catalyzed resin composition was then further degassed in vacuo for an additional 10 minutes at ambient temperature (20-25° C.) and then poured into an acrylic cylindrical mold (4" diameter×10" length) at ambient temperature (20-25° C.) and then heated in a laboratory oven to 140° C. at a rate of 1° C./minute, and postcured at 160° C. for two hours. The resulting syntactic foam had an average measured density of 36.72 pounds per cubic foot (pcf) and an average compressive peak stress of 52 (MPa).

Example 31

Glass Microsphere Syntactic Foam with Silane and Peroxide Additives

Ultrene® 99 dicyclopentadiene (DCPD) is formulated with 2 PHR Ethanox® 4702 antioxidant, 0.5 PHR CAB-O-SIL® TS-610 fumed silica, 5 ppm CHP, 1.5 PHR A174 silane, 2 PHR di-tert-butyl peroxide, and K11 glass microspheres (57% by volume). The resin is degassed in vacuo for 20 minutes at room temperature, and then catalyzed by the addition of C827 (monomer to catalyst ratio 60,000:1) in a suspension of mineral oil. The catalyzed resin mixture is then further degassed in vacuo for an additional 5 minutes and is then poured into a 6"×4"×6" aluminum mold and allowed to cure at room temperature for one hour before postcure at 160° C. for two hours. The resulting syntactic foam is expected to have a superior average compressive peak stress.

Example 32

Glass Microsphere Syntactic Foam with Silane and Peroxide Additives

DCPD containing 5% tricyclopentadiene is formulated with 2 PHR Ethanox® 4702 antioxidant, 0.5 PHR CAB-O-SIL® TS-610 fumed silica, 5 ppm CHP, 1.5 PHR allyltrimethoxysilane, 2 PHR di-tert-butyl peroxide, and K11 glass microspheres (57% by volume). The resin is degassed in vacuo for 20 minutes at room temperature, and then catalyzed by the addition of C827 (monomer to catalyst ratio 60,000:1) in a suspension of mineral oil. The catalyzed resin mixture is then further degassed in vacuo for an additional 5 minutes and is then poured into a 6"×4"×6" aluminum mold and allowed to cure at room temperature for one hour before postcure at 160° C. for two hours. The resulting syntactic foam is expected to have a superior average compressive peak stress.

Example 33

Glass Microsphere Syntactic Foam with Silane and Peroxide Additives

DCPD containing 5% tricyclopentadiene is formulated with 2 PHR Ethanox® 4702 antioxidant, 0.5 PHR CAB-O-SIL® TS-610 fumed silica, 5 ppm CHP, 1.5 PHR vinyltriethoxysilane, 2 PHR di-tert-butyl peroxide, and K11 glass microspheres (57% by volume). The resin is degassed in vacuo for 20 minutes at room temperature, and then catalyzed by the addition of C827 (monomer to catalyst ratio 60,000:1) in a suspension of mineral oil. The catalyzed resin mixture is then further degassed in vacuo for an additional 5 minutes and is then poured into a 6"×4"×6" aluminum mold and allowed to cure at room temperature for one hour before postcure at 160° C. for two hours. The resulting syntactic foam is expected to have a superior average compressive peak stress.

Example 34

Glass Microsphere Syntactic Foam with Silane and Peroxide Additives

DCPD containing 5% tricyclopentadiene is formulated with 2 PHR Ethanox® 4702 antioxidant, 0.5 PHR CAB-O-SIL® TS-610 fumed silica, 5 ppm CHP, 1.5 PHR gamma-acryloxypropyltrimethoxysilane, 2 PHR di-tert-butyl peroxide, and K11 glass microspheres (57% by volume). The resin is degassed in vacuo for 20 minutes at room temperature, and then catalyzed by the addition of C827 (monomer to catalyst ratio 60,000:1) in a suspension of mineral oil. The catalyzed resin mixture is then further degassed in vacuo for an additional 5 minutes and is then poured into a 6"×4"×6" aluminum mold and allowed to cure at room temperature for one hour before postcure at 160° C. for two hours. The resulting syntactic foam is expected to have a superior average compressive peak stress.

Example 35

Glass Microsphere Syntactic Foam with Silane and Peroxide Additives

DCPD containing 5% tricyclopentadiene is formulated with 2 PHR Ethanox® 4702 antioxidant, 0.5 PHR CAB-O-SIL® TS-610 fumed silica, 5 ppm CHP, 1.5 PHR norbornenyltriethoxysilane, 2 PHR di-tert-butyl peroxide, and K11 glass microspheres (57% by volume). The resin is degassed in vacuo for 20 minutes at room temperature, and then catalyzed by the addition of C827 (monomer to catalyst ratio 60,000:1) in a suspension of mineral oil. The catalyzed resin mixture is then further degassed in vacuo for an additional 5 minutes and is then poured into a 6"×4"×6" aluminum mold and allowed to cure at room temperature for one hour before postcure at 160° C. for two hours. The resulting syntactic foam is expected to have a superior average compressive peak stress.

What is claimed is:

1. A method for preparing a syntactic foam, comprising the steps of:
    combining at least one cyclic olefin, at least one type of microparticulate density modulator, and an adhesion promoter comprising a functionalized silane and a peroxide to form a resin composition;
    wherein the combined concentration of the functionalized silane and the peroxide present in the resin composition range from 0.5-3.5 phr and the amount of the peroxide present is equal to or greater than the amount of functionalized silane present;
    adding at least one cyclic olefin metathesis catalyst to the resin composition to form a catalyzed resin composition; and
    curing the catalyzed resin composition to form the syntactic foam,
    wherein the at least one type of microparticulate density modulator is borosilicate glass microspheres, wherein the at least one cyclic olefin is a mixture of dicyclopentadiene and tricyclopentadiene, the functionalized silane is y-methacryloxypropyl-trimethoxy silane, and the peroxide is di-tert-butyl peroxide.

2. The method according to claim 1, wherein the cyclic olefin metathesis catalyst is a Group 8 transition metal complex having the structure:

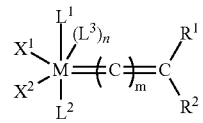

wherein:
    M is a Group 8 transition metal selected from ruthenium or osmium;
    $L^1$, $L^2$, and $L^3$ are independently selected from neutral electron donor ligands;
    n is 0 or 1 for $L^3$;
    m is 0, 1, or 2;
    $X^1$ and $X^2$ are independently anionic ligands;
    $R^1$ is selected from hydrogen, hydrocarbyl, substituted hydrocarbyl, heteroatom-containing hydrocarbyl, substituted heteroatom-containing hydrocarbyl, and functional groups;
    $R^2$ is selected from hydrocarbyl, substituted hydrocarbyl, heteroatom-containing hydrocarbyl, substituted heteroatom-containing hydrocarbyl, and functional group; wherein one or both of $R^1$ and $R^2$ may have the structure $-(W)_n-U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion;
    n is 0 or 1 for the $-(W)_n-U^+V^-$ moiety; and
    wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

3. The method according to claim 2, wherein at least one of $L^1$, $L^2$, and $L^3$ is an N heterocyclic carbene ligand of structure:

wherein:
Q is $-CR^{11}R^{12}-CR^{13}R^{14}-$ or $-CR^{11}=CR^{13}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups, or wherein any two of $R^{11}$, $R^{12}$, $R^{13}$, and $R^{14}$ may be linked together to form a substituted or unsubstituted, saturated or unsaturated ring; and $R^3$ and $R^4$ are unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide.

4. The method according to claim 1, wherein the cyclic olefin metathesis catalyst is a Group 8 transition metal complex having the structure:

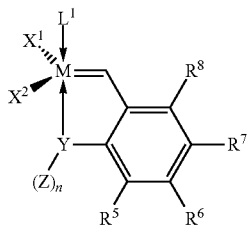

wherein:
M is a Group 8 transition metal selected from ruthenium or osmium;
$X^1$ and $X^2$ are independently anionic ligands;
$L^1$ is selected from neutral electron donor ligands;
Y is a heteroatom selected from N, O, S, and P;
$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, and borate; and any combination of $R^5$, $R^6$, $R^7$, and $R^8$ can be linked to form one or more cyclic groups;
n is 1 or 2, such that n is 1 for the divalent heteroatoms O or S, and n is 2 for the trivalent heteroatoms N or P; and
Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, RE, $R^7$, and $R^8$ may be linked to a support.

5. The method according to claim 1, wherein at least one further type of microparticulate density modulator is combined with the at least one cyclic olefin.

6. The method according to claim 1, wherein the steps of preparing the syntactic foam are carried out without the use of a solvent.

7. The method according to claim 1, wherein the combined concentration of the functionalized silane and the peroxide present in the resin composition range from 1-3 phr.

8. The method according to claim 1, wherein the combined concentration of the functionalized silane and the peroxide present in the resin composition is about 3 phr.

9. The method according to claim 8, wherein the steps of preparing the syntactic foam are carried out without the use of a solvent.

10. The method according to claim 1, wherein the combined concentration of the functionalized silane and the peroxide present in the resin composition range from 1.5-2 phr.

11. The method according to claim 1, wherein the combined concentration of the functionalized silane and the peroxide present in the resin composition range from 3-3.5 phr.

* * * * *